US011495229B1

(12) United States Patent
Hu et al.

(10) Patent No.: US 11,495,229 B1
(45) Date of Patent: Nov. 8, 2022

(54) AMBIENT DEVICE STATE CONTENT DISPLAY

(71) Applicant: Amazon Technologies, Inc., Seattle, WA (US)

(72) Inventors: Guoning Hu, Fremont, CA (US); Michael Hart, Los Gatos, CA (US); Seth Brickman, Bellevue, WA (US); Ashok Gupta, San Jose, CA (US); David Jason Jones, Burlingame, CA (US); Sandy Huang Cook, Palo Alto, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 155 days.

(21) Appl. No.: 17/109,890

(22) Filed: Dec. 2, 2020

Related U.S. Application Data

(63) Continuation of application No. 16/365,509, filed on Mar. 26, 2019, now Pat. No. 10,896,679.

(51) Int. Cl.
  *G10L 15/22* (2006.01)
  *G10L 15/06* (2013.01)
  *G10L 15/30* (2013.01)

(52) U.S. Cl.
  CPC ............ *G10L 15/22* (2013.01); *G10L 15/063* (2013.01); *G10L 15/30* (2013.01); *G10L 2015/223* (2013.01)

(58) Field of Classification Search
  USPC .................................... 704/1–504, 243, 231
  See application file for complete search history.

(56) References Cited

U.S. PATENT DOCUMENTS

| | | | | |
|---|---|---|---|---|
| 9,581,993 | B2 * | 2/2017 | McAdam | G05B 23/0272 |
| 10,075,140 | B1 * | 9/2018 | Dietrich | H03G 3/3089 |
| 10,896,679 | B1 * | 1/2021 | Hu | G10L 15/063 |
| 2003/0209893 | A1 | 11/2003 | Breed et al. | |
| 2004/0129478 | A1 | 7/2004 | Breed et al. | |
| 2005/0046584 | A1 | 3/2005 | Breed et al. | |
| 2014/0357312 | A1 * | 12/2014 | Davis | G06V 20/20 |
| | | | | 455/550.1 |
| 2015/0227135 | A1 * | 8/2015 | McAdam | G05B 19/414 |
| | | | | 700/83 |
| 2015/0286873 | A1 * | 10/2015 | Davis | G06F 1/1694 |
| | | | | 382/103 |
| 2016/0104486 | A1 * | 4/2016 | Penilla | G10L 15/02 |
| | | | | 704/232 |
| 2018/0101776 | A1 * | 4/2018 | Osotio | G06F 16/258 |
| 2019/0278841 | A1 * | 9/2019 | Pusateri | G10L 15/26 |
| 2020/0278738 | A1 | 9/2020 | Madar et al. | |

* cited by examiner

*Primary Examiner* — Marcus T Riley
(74) *Attorney, Agent, or Firm* — K&L Gates LLP

(57) ABSTRACT

Devices and techniques are generally described for sending a first instruction for a device to output first content while the speech-processing device is in an ambient state during a first time period. First feedback data is received indicating that a first action associated with the first content was requested at a first time. A determination is made that the first time is during the first time period. Timing data related to a current time of the device is determined. Second content is determined based at least in part on the first action being requested during the first time period and the timing data. A second instruction is sent effective to cause the device to output second content while in the ambient state during a second time period.

20 Claims, 10 Drawing Sheets

AMBIENT DEVICE STATE CONTENT DISPLAY

CROSS-REFERENCE TO RELATED APPLICATIONS

This application is a continuation of and claims priority to U.S. patent application Ser. No. 16/365,509, filed Mar. 26, 2019, now U.S. Pat. No. 10/896,679, the disclosure of which is incorporated herein by reference in its entirety.

BACKGROUND

Automatic speech recognition (ASR) combined with language processing techniques may enable a computing device to retrieve and process commands from a user based on the user's spoken commands. In some systems, speech recognition and/or voice-controlled devices activate upon detection of a spoken "wake-word." Spoken requests are translated into computer-executable instructions. The executable instructions are executed and a corresponding task is performed. Such speech processing and voice control may be used by personal computers, hand-held devices, telephone computer systems, and a wide variety of other computing devices to improve human-computer interactions and to control various systems. In various examples, speech-processing enabled devices may comprise or may be configured in communication with displays for showing images and video and/or speakers for outputting audio.

DETAILED DESCRIPTION

Figure 1:
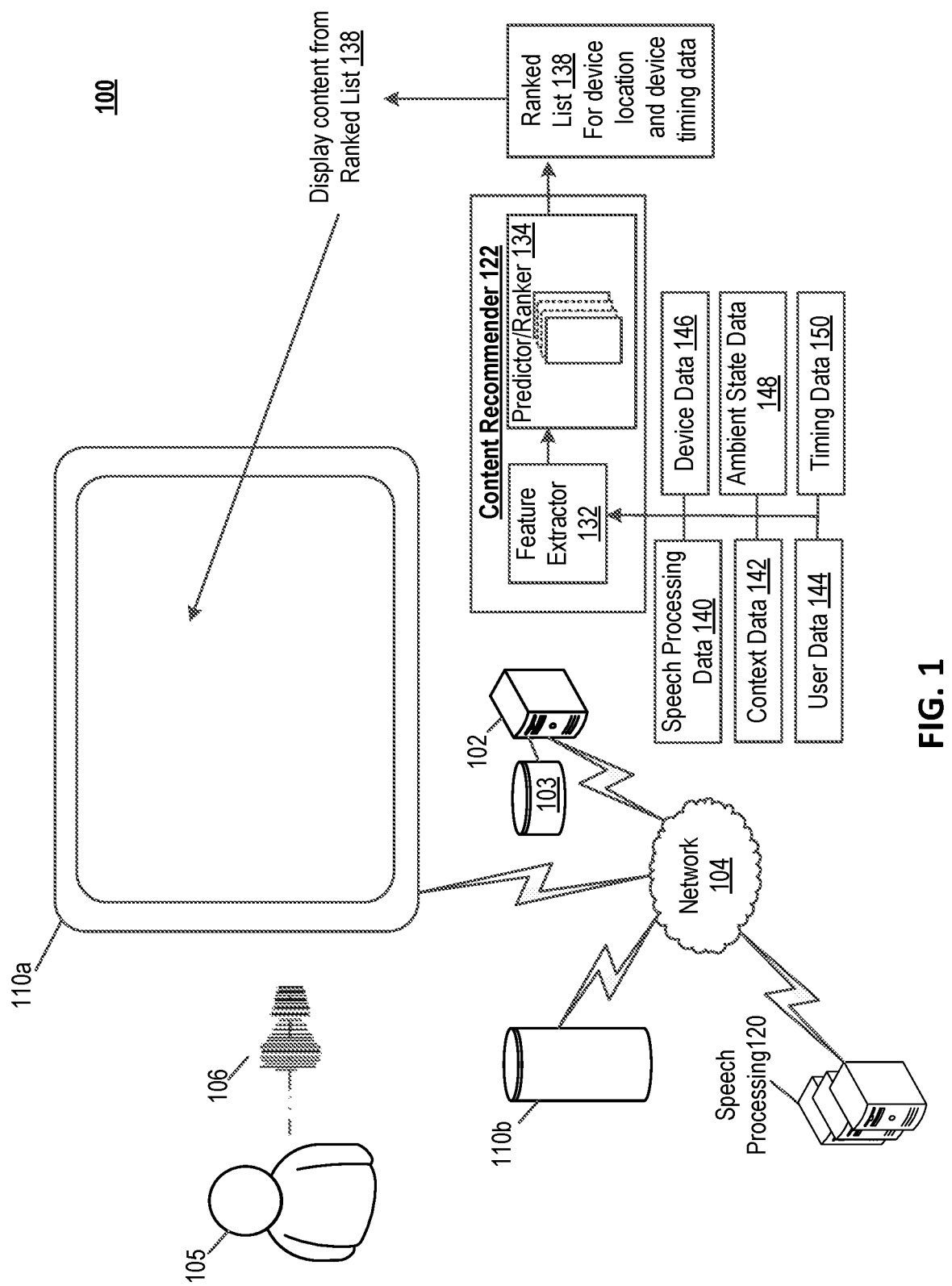
FIG. 1 is a conceptual illustration of a system configured to recommend content to be provided to a user, according to various embodiments of the present disclosure.

In the following description, reference is made to the accompanying drawings that illustrate several examples of the present invention. It is understood that other examples may be utilized and various operational changes may be made without departing from the spirit and scope of the present disclosure. The following detailed description is not to be taken in a limiting sense, and the scope of the embodiments of the present invention is defined only by the claims of the issued patent.

Automatic speech recognition (ASR) is a field of computer science, artificial intelligence, and linguistics concerned with transforming audio data associated with speech into text data representative of that speech. Natural language understanding (NLU) is a field of computer science, artificial intelligence, and linguistics concerned with enabling computers to derive meaning from text input containing natural language, resulting in specific executable commands or other type of instructions. Text-to-speech (TTS) is a field of computer science, artificial intelligence, and linguistics concerned with enabling computers to output synthesized speech. ASR, NLU, and TTS may be used together as part of a speech processing system.

Spoken language understanding (SLU) is a field of computer science, artificial intelligence, and/or linguistics that receives spoken language as an input, interprets the input, and generates executable commands that may be executed by one or more other computing devices and/or speech processing components. In various examples, spoken language understanding may be a combination of ASR systems and NLU systems, while in other examples, spoken language understanding may be a single model or other type of component effective to perform the functions of both ASR and NLU or otherwise take audio data as an input and output executable commands or other types of instructions representing the meaning of the audio data. In various further examples, SLU may include TTS where a machine learning model may receive input audio data (e.g., a user utterance) and may generate output audio data in response to the utterance.

Speech processing may be used in a variety of contexts, including in speech processing enabled devices (e.g., devices employing voice control and/or speech processing "personal assistants") and/or systems. Examples of speech processing systems and/or voice-enabled personal assistants include the Siri system from Apple Inc. of Cupertino, Calif., voice-enabled actions invoked by the Google Assistant system from Google LLC of Mountain View, Calif., Dragon speech recognition software from Nuance Communications of Burlington, Mass., the Cortana system from Microsoft of Redmond, Wash., voice-enabled skills invoked by the Alexa system from Amazon.com, Inc. of Seattle, Wash., etc.

Speech processing enabled devices may include microphones (e.g., far-field microphone arrays) used to transform audio into electrical signals. Speech processing may then be performed, either locally by the speech-processing enabled device, by one or more other computing devices communicating with the speech-processing enabled device over a network, or by some combination of the speech-processing enabled device and the one or more other computing devices. In various examples, speech-processing enabled devices may include and/or may be configured in communication with speakers and/or displays effective to output information obtained in response to a user's spoken request or command, or to output content that may be of interest to one or more user's (e.g., determined using the content recommender described herein).content recommender In some cases, speech-processing enabled devices may provide content to users while in an ambient state (e.g., unsolicited content that is not provided in response to a user request). In various examples, the ambient state of the device may be a default state of the device used when the device is not currently responding to a user request. Generally, any type of device capable of either displaying images and/or video, and/or capable of playing back audio may output content while in an ambient state, in accordance with the various techniques described herein. For example, a speech-processing enabled device may provide brief weather updates to a user, or may provide a brief summary of upcoming appointments to the user, from the user's calendar, without the user requesting such content. In another example, a device comprising a display may display sports scores, weather information, stock information, etc., without requiring the user to request such information. In various examples, speech-processing enabled devices may be "always on" devices that may be continually powered. The speech-processing enabled devices may enter an ambient state when not responding to a user utterance (e.g., after a timeout following completion of a most-recent user interaction). In various examples, the speech-processing enabled devices may be configured to display content and/or output audio content while in an ambient state. Various techniques described herein are related to determination of relevant, user-specific, and/or device-specific content for output while the speech-processing enabled device is in an ambient state. In various examples, relevant, user-specific content may be learned by a machine learning model based on both timing and location signals. Timing signals may describe a current time of day, time of week, season, etc., while location signals may describe a room location within a house or building and/or a geographic location of the device. Accordingly, recommended content may be selected based on the preferences of a particular user, depending on what the user and/or other similar users prefer during specific times, and while consuming content in specific locations. As described herein, user-controlled privacy settings associated with the various speech-processing enabled devices described herein may be used to selectively prevent the capture, aggregation, and/or storage of various data (e.g., audio data, video data, etc.) by speech-processing enabled devices according to user preferences. The foregoing examples are for illustrative purposes and are non-exhaustive. In general, any type of visual and/or audio content that may be of interest to a user may be provided by a speech-processing enabled device while in an ambient setting. Described herein are various techniques for dynamically determining content that is most likely to be of interest to individual users based on explicit and implicit user feedback, contextual data, device-specific data, user data, timing data, ambient state data, and/or other available data and displaying the content while the speech-processing enabled device is in an ambient setting. Further, the content recommender described herein may learn user preferences and extract feature data at least in part while the speech-processing enabled device is in an ambient setting. Advantageously, the various systems, models, and techniques described herein may provide content that is most likely to be of interest to a user, in a concise and non-intrusive manner, while avoiding content that is less likely to be of interest. Further, the various systems, models, and techniques described herein may tailor content to users over time and may adapt content to changes in user interests, user preferences, changing device settings or location, etc. Additionally, the predictive capability of the various systems, models, and techniques described herein may improve over time as more and more data is available that may be used to optimize machine learning models used to form predictions concerning the most relevant content.

Storage and/or use of data related to a particular person or device (e.g., contextual data and/or any personal data) may be controlled by a user using privacy controls associated with a speech-processing enabled device and/or a companion application associated with a speech-processing enabled device. Accordingly, users may opt out of storage of personal and/or contextual data and/or may select particular types of personal and/or contextual data that may be stored while preventing aggregation and storage of other types of personal and/or contextual data. Additionally, aggregation, storage, and use of personal and/or contextual information, as described herein, may be compliant with privacy controls, even if not technically subject to them, to bolster user trust. For example, personal, contextual, and other data described herein may be treated as if it fell under acts and regulations, such as the Health Insurance Portability and Accountability Act (HIPAA) and the General Data Protection Regulation (GDPR), even if it does not actually fall under these acts and regulations.

A speech-controlled computing system may answer user requests requesting the output of content and/or performance of one or more actions such as playing requested music, providing information in response to user questions, calling a taxi, displaying an image, etc. Generally, input data received by the various speech processing systems and components described herein may comprise natural language input data. Natural language input data may be in the form of spoken user utterances (e.g., a spoken user request), text data (e.g., a request typed by a user), audio data, and/or some combination of spoken user utterances, text data, and/or audio data. Similarly, user requests may be made using other interfaces besides speech-processing interfaces. For example, content may be selected using a touch input on a touch screen display, an input using a remote control device, a mouse click input, etc.

Speech-processing systems may be configured with multiple applications (e.g., thousands, tens of thousands, or more applications) that can be used to potentially respond to a user request. Applications may be referred to herein as "skills". Natural language processing systems may be effective to process spoken and/or textual natural language inputs to determine data representing a semantic understanding of the inputs. Skills may include any application effective to communicate with a natural language processing system in order to take one or more actions based on inputs from the natural language processing system. For example, a speech-processing system may include music skills, video skills, calendar skills, timer skills, general knowledge answering skills, game skills, etc.

The invocation of a skill by a user's utterance may include a request that an action be taken. The number of applications/skills continues to grow and the rate of growth is increasing as developers become more accustomed to application programming interfaces (APIs) and application development kits provided for the voice service. Rule-based approaches and/or predefined utterance matching have been used in some systems for processing requests spoken in a certain format to invoke a particular application. In at least some examples, a "skill," "skill component," "speech-processing skill," and the like may be software running on a computing device, similar to a traditional software application running on a computing device. Such skills may include a voice user interface in addition to or instead of, in at least some instances, a graphical user interface, smart home device interface, and/or other type of interface.

In various examples, a speech-processing enabled device or other device may output content (e.g., display of image data and/or video data, playback of audio, etc.) in an ambient context (e.g., during a time at which the speech-processing enabled device is in an ambient state, such as an idle state, or when no user requests are currently being processed). Timestamps may be associated with the output of content. For example, an image related to a particular skill may be displayed on a display of a speech-processing enabled device in an ambient mode for 30 seconds beginning at time t0. In various examples, a user may interact with the content either while the content is being output (e.g., displayed and/or during audio playback) or within a short amount of time after the content is output. For example, a user may interact with the image related to the particular skill by selecting a graphical control element related to the skill that is displayed on a touchscreen display. In another example, the user may interact with content by speaking a request that a skill related to currently or recently displayed content take a particular action. In still another example, a user may utter a voice command instructing the speech-processing enabled device to stop outputting the particular content. In other examples, the user may take no action in response to the content.

In some examples, the user interaction may occur either while the content is being output or within a threshold period of time afterward. Data representing the user interaction may be stored in a memory in association with the output content. In addition, data representing the nature of the interaction (such as whether the interaction was a positive interaction or a negative interaction) may be stored in the memory. Data representing the interaction and/or the nature of the interaction may be described herein as feedback data. As described in further detail below, the data indicating the output content, the timestamp indicating the time at which the content was output, data representing the user interaction, timestamp data representing a timing of the user interaction, data representing the nature of the user interaction, user data, context data, and/or device data may be used to train one or more components of a content recommender (e.g., machine learning models) to update parameters of the model in order to output content that is tailored for the particular speech-processing enabled device, the particular user, the particular timing, the particular location, and/or the particular context.

For example, a speech-processing enabled device including a display may output content related to a new album by a musical artist at time $t_1$. A user may thereafter, at time $t_2$, issue a spoken request, "Computer, play the new album by [musical artist]." A speech processing system may process the spoken user request (as described in further detail below) to cause the speech enabled device to begin playback of the requested album. A content recommender may store data related to the content that was displayed in association with data representing the user's interaction with the content, as well as other contextual data, user data, and/or device data, in a non-transitory computer-readable memory.

For example, the content recommender may determine that the image related to the new album by the musical artist was displayed at time $t_1$ for a duration of 20 seconds. This data related to the content and the timing during which the content was displayed (or otherwise output) may be stored in the memory. The content recommender may determine that, at time $t_2=t_1+10$ seconds, the user requested that the album be played back by the speech-processing enabled device. In various examples, the content recommender may receive this information from a speech-processing system that serviced the spoken user request after the speech-processing recommendation has performed ASR and NLU to determine a semantic interpretation of the request. In another example, the content recommender may receive this information from a skill effective to process the spoken request and initiate playback of the album.

The data representing the user interaction with the output content (e.g., data representing the user instruction to begin playback of the album) may be stored as a "label" in the memory in association with input feature data (e.g., input feature vector data or feature map data). Such labeled data may be subsequently used in batch training of the content recommender (and/or machine learning models thereof). In the current example, the input feature data may comprise data representing the output content (e.g., the image data representing the new album by the musical artist), timing data related to the display/output of the content and the user interaction (e.g., a current time, an amount of time between the display of the image and the spoken user request, etc.), context data (e.g., the time of day, the date, the season, the day of week, etc., at which the content was output, the geographic location of the device, etc.), device data (e.g., a current location associated with the speech-processing device (e.g., kitchen, bedroom, etc.), the device ID, the type of device, usage data concerning the device), user data (e.g., data identifying the user and/or users present during the issuance of the spoken request, user preference data (e.g., musical genres preferred by the particular user, etc.), user account data, etc.). The foregoing examples of input feature data are meant to be illustrative and are by no means exhaustive. Input feature data is described in further detail below. Input feature data may be encoded into feature vectors and/or feature maps and may be used in conjunction with the label representing the user interaction with the content to train one or more machine learning models to output content by the speech-processing enabled device that is most likely to be interesting to the user(s).

In at least some examples, a "skill," "skill component," and the like may be software that is run by a third party, to the herein disclosed speech processing system, without the third party provisioning or managing one or more servers for executing the skill. In such an implementation, the system may be triggered to run a skill in response to the third party calling the system via the Internet or a mobile application. Such implementation may include, but is not limited to, Amazon's AWS Lambda.

Content recommenders described herein may comprise one or more machine learning models effective to determine content to output while a device is in an ambient state. Generally, in machine learning models, after initialization, annotated training data may be used to generate a cost function or "loss" function that describes the difference between expected output of the machine learning model (e.g., the known label of the training data) and actual output in the output layer of the model. The parameters (e.g., weights and/or biases) of the machine learning model may be updated to minimize (or maximize) the cost. For example, the machine learning model may use a gradient descent algorithm to incrementally adjust the weights to cause the most rapid decrease (or increase) to the output of the loss function, depending on the desired training objective. Machine learning models of the content recommenders described herein may be iteratively trained whenever a suitable amount of training data has been accumulated. As described in further detail below, various user feedback and/or global feedback data may be used to generate training data for model training.

Feature vector representations of various input data may be sent to the machine learning model(s) of the content recommender to determine content for output while in an ambient state. The content recommender may send commands effective to cause the speech-processing enabled device to output content determined by the content recommender. The input feature vector representations may control activations of neurons in an input layer of the machine learning models, which may in turn control activations in subsequent layers of the machine learning models. Input data represented by feature vector representations may include speech processing data representing a user utterance and/or user sentiment, context data, representing a context with respect to the device and/or other entity, user data representing one or more users interacting with the device, ambient state data indicating whether the device is in an ambient state and/or how the device entered into an ambient state, timing data, and/or device data. Various input signals are described in further detail below.

FIG. 1 is an illustration of a system 100 configured to recommend content to be provided to a user, according to various embodiments of the present disclosure.

As shown in FIG. 1, the system 100 includes speech-processing enabled devices 110a and 110b. In various examples, speech-processing enabled device 110a may include a display effective to display images and/or video data. Although not depicted, speech-processing enabled device 110a may comprise speakers and audio circuitry effective to output audio. Additionally, speech-processing device 110a may comprise one or more microphones effective to capture audio, such as spoken user utterances. Speech-processing enabled device 110b may be an example of a speech-processing enabled device that lacks an integrated display. Speech-processing enabled device 110b may comprise one or more speakers effective to output audio and/or one or more microphones effective to capture audio, such as spoken user utterances. Speech-processing devices 110a, 110b may communicate with one another over a network 104. In various examples, network 104 may represent a local area network (LAN) and/or a wide area network (WAN) such as the internet. Speech-processing enabled devices 110a, 110b may be effective to communicate over network 104 with speech-processing computing device(s) 120. As described in further detail below, speech-processing computing device(s) 120 may form a speech processing system that may perform various speech-processing techniques in order to semantically interpret and/or perform actions in response to user speech detected by speech-processing enabled devices 110 (including speech-processing enabled device 110a and/or 110b). Although, speech processing enabled devices 110 are shown and described in FIG. 1, any device capable of outputting content (e.g., audio, images, and/or video) may be used to output recommended content, in accordance with the various techniques described herein.

For example, a user 105 may speak an audible request (represented as audio data 106 in FIG. 1) for speech-processing enabled device 110a to display the current weather in Seattle, Wash. One or more microphones of speech-processing enabled device 110a may generate electrical signals corresponding to the audio data 106 and may encode and send such signals over network 104 to speech-processing computing device(s) 120. Speech-processing computing device(s) 120 may perform ASR to generate text data representative of the audible request. NLU may be used to generate one or more semantic interpretations of the text data. As described in further detail below, the NLU may determine one or more slots and/or intents that may correspond to one or more actions that may be taken in response to the spoken command. In various examples, the results of the NLU processing may be sent to a skill computing device(s) (not shown in FIG. 1). The skill computing device(s) may be effective to generate an instruction that may be effective, when executed by speech-processing enabled device 110a, to cause speech-processing enabled device 110a to perform an action. For example, the skill computing device(s) may be effective to generate instructions effective to cause speech-processing enabled device 110a to retrieve and display current weather data for Seattle, Wash. The instructions may be sent to, and executed by, speech-processing enabled device 110a in order to display the requested content on a display of speech-processing enabled device 110a.

Speech-processing devices 110a, 110b may communicate with computing device(s) 102 over network 104. Computing device(s) 102 may be configured in communication with a non-transitory computer-readable memory 103. Memory 103 may be local to computing device(s) 102, network-accessible, or some combination of local memory and network-accessible memory. Memory 103 may store instructions, that when executed by at least one processor of computing device(s) 102, are effective to program the at least one processor to generate content recommender 122.

Content recommender 122 may comprise feature extractor 132 and/or predictor/ranker 134. Feature extractor 132 may be effective to receive input data, such as speech processing data 140, context data 142, user data 144, device data 146, ambient state data 148, and/or timing data 150. This list of input data is non-exhaustive and other types of input data may be provided to content recommender 122 and/or feature extractor 132 in accordance with a desired implementation. In various examples, at least some of speech processing data 140 (e.g., representing past user interactions with content), context data 142, user data 144, and/or device data 146 may be generated and/or sent to content recommender 122 while content recommender is in an ambient state. Accordingly, the most relevant content may be predicted for a particular user and/or speech-processing enabled device irrespective of a current lack of interaction with the speech-processing enabled device by a user.

Feature extractor 132 may generate feature representations (e.g., feature vectors and/or feature maps) representing the speech processing data 140, context data 142, user data 144, device data 146, and/or other desired input data. Predictor/ranker 134 may be one or more machine learning models effective to receive the input data and to generate a ranked list of content for output. The training objective of predictor/ranker 134 may be to rank output content from content that is most likely to be of interest to a particular user (or group of users) and/or for a particular device, to the content that is least likely to be of interest. Ranked content may be output in an output layer of predictor/ranker as ranked list 138. In various examples, content recommender 122 and/or computing device(s) 102 may send instructions for speech-processing enabled devices 110a, 110b to output (e.g., display, playback, etc.) content from ranked list 138.

Predictor/ranker 134 may be a deep learning network such as a convolutional neural network (CNN), a recurrent neural network (RNN), or any other machine learning model effective to rank content. In various examples, predictor/ranker 134 may comprise a classification algorithm such as logistic regression, random forest, support vector machine, or a deep neural network effective to recommend content. Predictor/ranker 134 may be effective to take, as input, feature data generated by feature extractor 132, and may generate, as output, ranked list 138. In various examples, speech-processing enabled devices 110*a*, 110*b* may output content from ranked list 138 while speech-processing enabled devices 110*a*, 110*b* are in an ambient setting. As used herein, an ambient setting refers to states of speech-processing enabled devices 110*a*, 110*b* in which the devices are not currently engaged in user interaction and/or engaged in the performance of a previously-requested user action.

Speech-processing enabled devices 110*a*, 110*b* may select content for output from ranked list 138 in any suitable manner. For example, speech-processing enabled devices 110*a*, 110*b* may output the highest-ranked result from ranked list 138, followed by the next-highest ranked result, etc. In at least some examples, predictor/ranker 134 may be effective to determine an amount of time and/or a time period during which to output each piece of content in ranked list 138. For example, the highest ranked content may be current weather data. The ranked list 138 may include information indicating that the current weather data is to be displayed by speech-processing device 110*a* for a duration of 20 seconds, every two minutes, on a repeating basis from 7:30 am to 9:30 am, weekdays. In some other examples, predictor/ranker 134 may determine that content related to entertainment is most likely to be of interest to a particular user 105 during Friday evenings and Saturday evenings, whereas calendar reminders may be most likely to be of interest to a particular user during weekday mornings. In some other examples, predictor/ranker 134 may determine that user 105 prefers content to be displayed more frequently, or less frequently, and/or for shorter (or longer) periods of time, relative to the current frequency and duration of content output. In various examples, the predictor/ranker 134 may rank content on the basis of past user actions and/or based on ambient data collected for the particular speech-processing enabled device. In some examples, collaborative filtering may be used to predict content based on the interactions of other users with output content (e.g., global features representing content popularity). Additionally, in some examples, ranked list 138 may include instructions effective to provide an order (e.g., an ordered list of content) in which the content in ranked list 138 should be output by speech-processing enabled device(s) 110*a*, 110*b*. For example, the content in ranked list 138 may be a number of images. Ranked list 138 may include instructions regarding the order in which the images should be displayed.

As described in further detail below, in some examples, predictor/ranker 134 may determine content in ranked list 138 based at least in part on context data 142 that indicates a way in which the relevant speech-processing enabled device entered into an ambient mode (e.g., an ambient state). For example, speech-processing enabled device(s) 110*a*, 110*b* may enter into an ambient mode after a time-out occurs in which the speech-processing enabled device(s) 110*a*, 110*b* have not received any further user instructions following a user interaction. In another example, speech-processing enabled device(s) 110*a*, 110*b* may enter an ambient mode when a customer requests that the speech-processing enabled device(s) 110*a*, 110*b* return to "Home" or to an ambient state. In some other examples, speech-processing enabled device(s) 110*a*, 110*b* may enter into an ambient state when speech-processing enabled device(s) 110*a*, 110*b* detect the presence of a user (e.g., via a camera, motion detector, microphone, and/or other sensor). Predictor/ranker 134 may determine that a user and/or particular speech-processing enabled device(s) 110*a*, 110*b* may prefer certain types of content depending on the context in which the speech-processing enabled device(s) 110*a*, 110*b* entered into the ambient state. The order in which content is output and/or displayed may depend on the speech-processing data 140, context data 142, user data 144, device data 146, and/or other user feedback data (e.g., a user selection of content on a graphical user interface of speech-processing enabled device(s) 110*a*, 110*b*). In various examples, Normalized Discounted Cumulative Gain (NDCG) may be used to take into account the order in which content is output or displayed when determining a measure of a user engagement with the output content. NDCG values may represent a quantitative level of importance (e.g., a gain value) that may be used to modify a feedback signal to account for an order in which content appeared. For example, a lower-positioned item of content (e.g., an item that is displayed/output later relative to other content) may be interacted with less than a higher-positioned item of content (e.g., an item that is displayed/output prior to the lower-positioned item of content). However, NDCG may be used to account for the position of the content when determining a level of user engagement. In the example, the lower-positioned item of content may subsequently be ranked higher in ranked list 138, as the higher-positioned item of content may be discounted due to its original, higher position. For example, the higher-positioned item may have an NDCG score that is lower than the NDCG score of the lower-positioned item of content, based on the relative positions. User interaction data indicating user interaction with output content (e.g., feedback data 206) may be multiplied by the NDCG score in order to generate modified feedback data in order to account for the importance of the order in which the content was displayed when learning the preferred order in which to display content. Machine learning models (e.g., predictor/ranker 134) may be updated using the modified feedback data to learn recommended orders of content output.

Various techniques may be used to smooth NDCG measures. Additionally, in various examples, the NDCG measure may not be linearly-related to the position or order of output of content. Further, in some examples, the relationship between position/order of output and the NDCG measure (e.g., a position-to-NDCG curve) may depend on the way in which the particular speech-processing enabled device(s) 110*a*, 110*b* entered into an ambient state. In various examples, different position-to-NDCG curves may be used for different ways of entering into an ambient state (e.g., a first position-to-NDCG curve for a device timing out, a second position-to-NDCG curve for a user request for a device to "Go Home," etc.) when determining a level of user engagement/interaction with the content. In turn, the level of user engagement/interaction may be used by predictor/ranker 134 (e.g., as a feature and/or as training data) to generate ranked list 138.

Speech processing data 140 may represent speech-processing interactions between speech-processing enabled devices 110*a*, 110*b* and speech-processing computing device(s) 120. Speech-processing data 140 may be provided by speech-processing computing device(s) 120 as an input signal to content recommender 122. For example, speech processing data 140 may include indications that user 105 has requested content that is currently displayed on speech-processing enabled device 110*a* or that has recently been described in audio output by speech-processing enabled device 110*b* (e.g., feedback data representing previous actions related to content). Speech processing data 140 may further comprise time stamps indicating a timing of the user interaction with the speech-processing computing device(s) 120. As previously described, in some examples, speech processing data 140 may be provided by a skill executing on speech processing computing device(s) 120 and/or executing on a skill computing device. In various examples, speech processing data 140 may include an indication of the nature of the user's interaction with content. For example, if user 105 requests that speech-processing enabled device 110a stop showing a particular image or video, speech-processing data 140 may indicate that user 105 interrupted playback of the content. Speech processing data 140 may include indications of user feedback concerning content. For example, a user may say "Computer, I love this song", or "computer, don't show me that again". Such user feedback may be encoded as user sentiment scores related to the applicable content and may be used, in part, to train predictor/ranker 134.

Additionally, in various examples user 105 may request different content apart from what is currently shown. An indication of a request for different content may be encoded as speech processing data 140 and may be provided to content recommender 122. Generally, feature extractor 132 may generate feature data based on the provided input signals (including speech processing data 140). In at least some examples, speech-processing computing device(s) 120 may extract feature data from speech-processing related requests and provide such feature data to content recommender. In such scenarios, the feature data may be provided directly to predictor/ranker 134 instead of to feature extractor 132.

Speech-processing systems (e.g., a speech-processing system implemented by speech-processing computing device(s) 120) may answer user commands requesting the output of content. In various examples, in order to interpret a request, the NLU component of a speech processing system may have access to context data 142. Context data 142 may be factual information contextualized to a particular entity. An entity may be a particular device ID, a particular IP address, an account ID, a request ID, etc. For example, user 105 may speak the request, "Computer, what is the score of the football game?" The speech processing system may have access to context data 142 related to the device ID (e.g., an identifier of speech-processing enabled device 110a). For example, the speech processing system may access context data 142 indicating that the device ID is registered to an address in Seattle, Wash. In the example, the speech processing system may use this contextual information to determine that the user is requesting the score of the local Seattle football team. By contrast, global information may be information that is the same regardless of any particular entity. For example, the speed of light in vacuum is 299,792,458 meters per second. The speed of light in vacuum is an example of global information. By contrast, a particular person's favorite song is contextual data related to that particular person.

Context data 142 concerning speech-processing enabled device(s) 110a, 110b, and/or other devices, may be provided to content recommender 122. Context data 142 may be related to a user request, may be related to the particular speech-processing enabled device, and/or may be related to the content output by speech-processing enabled device(s) 110a, 110b while these devices are in an ambient state. Context data 142 may represent previous content selected on a device (e.g., speech-processing enabled device(s) 110a). Context data 142 may be metadata related to content (e.g., a text summary of a movie, the genre of a song, etc.). Context data 142 may represent an amount of time since the content was last selected by a particular device and/or by a particular user. Context data 142 may represent a personal event (e.g., a user's birthday) and/or a public event (e.g., a public holiday, a sports game, etc.).

In an example, context data 142 may comprise data indicating that it is Monday, Mar. 18, 2019 at 7:13 am. Context data 142 may further indicate that speech-processing enabled device(s) 110a, 110b are located in Tucson, Ariz. Feature extractor 132 may generate feature representation data (e.g., feature vectors and/or feature maps) representing the context data 142 that may be provided to predictor/ranker 134 (e.g., to an input layer of predictor/ranker 134). As previously described, in some examples, context data 142 may include an indication of how the particular speech-processing enabled device(s) 110a, 110b entered into an ambient state. As described above, users may prefer different content depending on how the speech-processing enabled device(s) 110a, 110b entered an ambient state. For example, a user may tend to prefer weather-related content when the speech-processing enabled device(s) 110a, 110b enters an ambient state by reason of detecting the presence of a user. However, the user may tend to prefer calendar content to be displayed when the speech-processing enabled device(s) 110a, 110b enters an ambient state due to a user requests that the speech-processing enabled device(s) 110a, 110b return to a home screen. As described herein, training data (e.g., user feedback data) provided to predictor/ranker 134 may be used to determine the relevant features used to predict the most relevant content. Accordingly, in some examples, features may be related to indications of how the relevant speech-processing enabled device(s) 110a, 110b entered into an ambient state, and predictions of relevant content (e.g., ranked list 138) may be formed on the basis of such input features. In various examples, some of the foregoing context data 142 may also be described as other types of data (e.g., user data 144, device data 146, ambient state data 148, timing data 150, etc.). Accordingly, context data 142 may at least partially overlap with data sets and/or definitions of various other categories of data input to content recommender 122.

User data 144 may be data representing a user or group of user's. For example, speech-processing enabled devices 110a, 110b may comprise one or more cameras effective to capture video of the environment surrounding speech-processing enabled devices 110a, 110b. Computer vision techniques may be used to identify one or more users currently within a field-of-view of the camera(s). Data representing the identities of the users may be used by content recommender 122 to provide the content that is most likely to be of interest to the particular user(s) based on the user identity. In various other examples, voice recognition may be used to identify users. As previously described, privacy controls may be employed by the user(s) to limit the amount of personal data captured and/or used by speech-processing enabled devices 110a, 110b. For example, user identification techniques may be selectively disabled and enabled according to user preference. User data 144 may optionally comprise other data related to the user. For example, user data may indicate preferred sports teams, preferred music, preferred update style, preferred frequency of updates, preferred user routines (e.g., announce upcoming calendar appointments, followed by weather forecasts for the day, followed by current stock prices of stocks owned by user 105), etc. In various examples, some of the foregoing information may also be described as contextual data related to the user. Accordingly, context data 142 and user data 144 may be at least partially overlapping data sets and at least some data belonging to one set may properly be described as belonging to the other. In at least some cases, user data 144 may be determined and/or provided to content recommender 122 while speech-processing enabled device(s) 110a, 110b are in an ambient state.

Device data 146 may be data pertaining to speech-processing enabled devices 110a, 110b. For example, device data 146 may comprise an indication of a device type, a device identifier, device settings (e.g., privacy settings, display settings, speaker settings, etc.). Additionally, device data 146 may comprise location data (e.g., geographical location and/or local location). The local location of a particular device may be, for example, a room in which the device is situated (e.g., living room, bedroom, kitchen, garage, etc.). Geographical location may be explicitly provided by a user (e.g., through a companion application) or may be determined based on IP address and/or geo-location data provided by speech-processing enabled devices 110a, 110b. Local location data may be provided explicitly by the user 105, or may be determined based on pattern matching. Implicit determination of local location is described in further detail below, in reference to FIG. 3. In at least some cases, device data 146 may be determined and/or provided to content recommender 122 while speech-processing enabled device(s) 110a, 110b are in an ambient state.

Device data 146 may further comprise indications of selections made using non-speech interfaces of the speech-processing enabled devices 110a, 110b. For example, a user may select an image on a touchscreen display of speech-processing enabled device 110a. Device data 146 may include an indication of the touch input. Optionally, the device data 146 may also comprise an indication of displayed content associated with the touch input. In various examples, some of the foregoing device data may also be described as contextual data related to the user. Accordingly, context data 142 and device data 146 may be at least partially overlapping data sets and at least some data belonging to one set may properly be described as belonging to the other.

Ambient state data 148 may comprise data describing whether or not the relevant device (e.g., speech-processing enabled device(s) 110a, 110b) are in an ambient state, how the relevant device entered into an ambient state, how long the relevant device has been in an ambient state, etc. Feature data (e.g., a feature vector representing ambient state data 148) may be generated to represent ambient state data 148 by feature extractor 132. The feature data may be sent as an input feature to predictor/ranker 134 during prediction so that content may be recommended based on the ambient state data 148 (as well as based on other features input to predictor/ranker 134).

Timing data 150 may comprise information describing a current time, current day of the week, current day of the month, current day of the year, etc. Feature data (e.g., a feature vector representing timing data 150) may be generated to represent timing data 150 by feature extractor 132. The feature data may be sent as an input feature to predictor/ranker 134 during prediction so that content may be recommended based on the timing data 150 (as well as based on other features input to predictor/ranker 134).

Ranked list 138 may be tailored for a particular time and/or for a particular device location. After training, predictor/ranker 134 may learn that different content is most suitable during different time periods and/or for devices at different locations. For example, weather content may be recommended for devices located in a kitchen during weekday morning hours while recipe information may be recommended for devices located in the kitchen during weekday evening hours. Similarly, a determination may be made that recipe information may not be popular content to display in a device located in a bedroom. Instead, the predictor/ranker 134 may learn that entertainment content is popular for devices located in a bedroom. In various examples, different model instances may be trained for different time slots. For example, a first instance of predictor/ranker 134 may be trained for prediction during weekday mornings from 8 am-11 am, a second instance of predictor/ranker 134 may be trained for prediction during weekday afternoons from 2 pm-4 pm, a third instance of predictor/ranker 134 may be trained for prediction during weekend mornings, etc. A combination of global training data and device-specific and/or user-specific training data (e.g., labeled feedback data) may be used to train the various predictor/ranker models 134 described herein.

Figure 2:
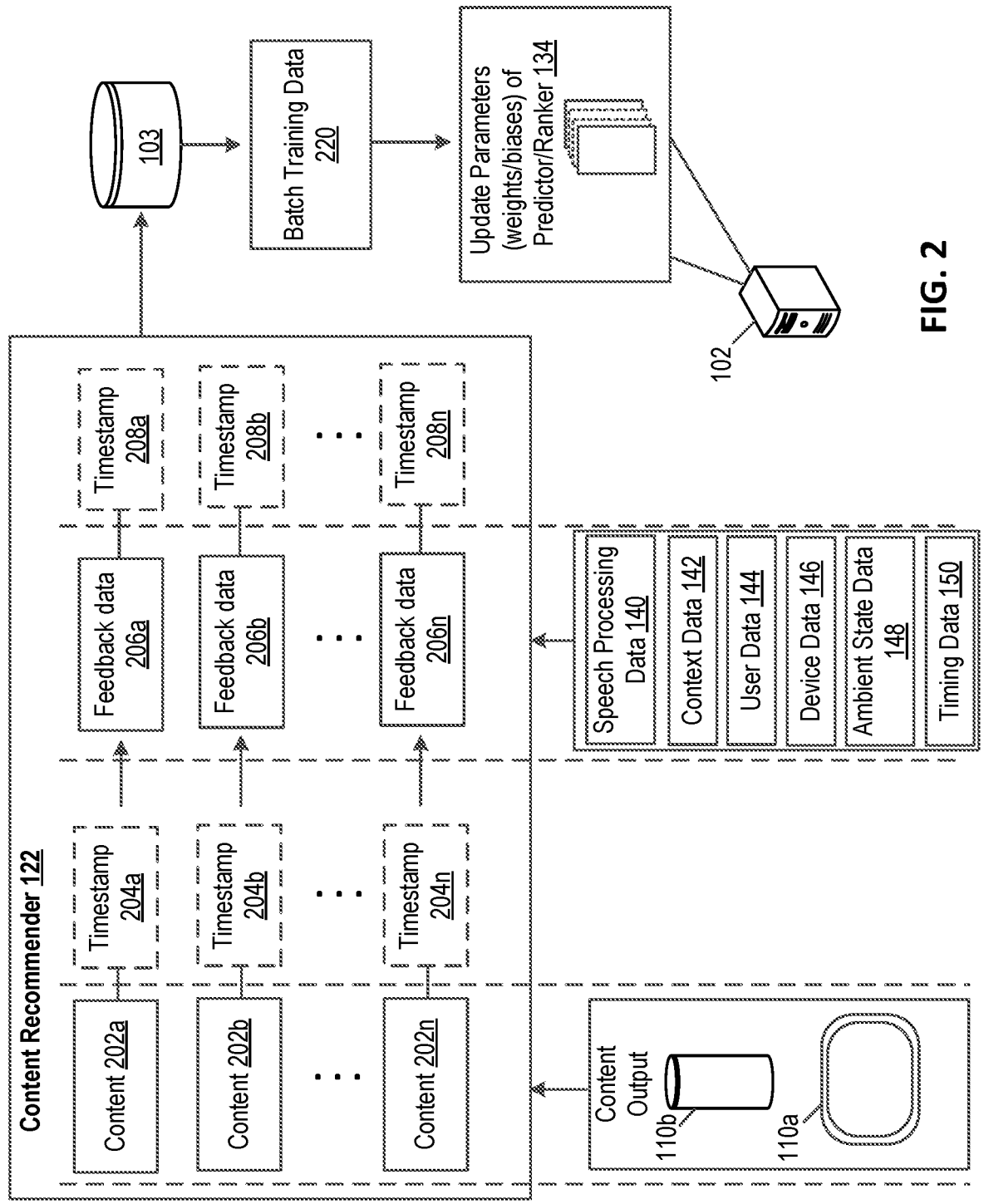
FIG. 2 is a conceptual diagram illustrating techniques that may be used to train a content recommendation machine learning model, according to various embodiments of the present disclosure.

FIG. 2 is a conceptual diagram illustrating techniques that may be used to train content recommendation machine learning model (e.g., content recommender 122), according to various embodiments of the present disclosure. In at least some examples, those components displayed in FIG. 2 which were previously described in reference to FIG. 1 may not be described again in reference to FIG. 2, for purposes of clarity and brevity.

As described above in reference to FIG. 1, content recommender 122 may send a ranked list 138 (shown in FIG. 1) of content that may be output (e.g., displayed and/or played back by speech-processing enabled devices 110a, 110b. Such content may include image data such as weather data visualizations, stock tickers, sports scores, album covers, family photos stored on a user account accessible by the speech-processing enabled devices 110a, 110b, calendar reminders, etc. Additionally, content may be audio content such as daily reminders, updates related to content of ranked list 138 (e.g., "A new episode of [Television Show] is airing tonight at 8 pm on [Television Network]."), updates related to upcoming appointments, audio of sports scores, stock tickers, weather data, etc.

In FIG. 2, such content is depicted as content 202a, 202b, . . . , 202n. Each content is associated with a timestamp indicating the time at which the respective content is output (e.g., displayed and/or played back) and, optionally, a duration of the content being shown/played back. For example, content 202a may be associated with timestamp 204a, content 202b may be associated with timestamp 204b, etc. Content recommender 122 may store indications (e.g., identifying data) of output content 202a, 202b, . . . 202n in memory 103. Timestamps 204a, 204b, . . . 204n may each be stored in memory 103 in association with the respective content to which the timestamp pertains (e.g., in a data structure).

Content recommender 122 may receive feedback data 206a, 206b, . . . , 206n. Feedback data 206a, 206b, . . . , 206n may be received from a variety of sources. For example, feedback data may be received from the speech processing system executed by speech processing computing device(s) 120 as speech processing data 140. An example of such feedback data may be an indication that the user interrupted playback of content, that the user provided positive feedback related to content, that the user requested different content, that the user invoked a different skill apart from a skill that was then in use, etc. Feedback data 206a, 206b, . . . , 206n may include an indication of content requested by a user (e.g., selected and requested using an utterance) along with context data 142 related to the request (e.g., a time of day, an indication of ambient content displayed when the request was received, a day of the week, a location of the device receiving the request, etc.). Additionally, feedback data 206a, 206b, . . . , 206n may include a list of previously-requested actions (e.g., the past N requests) in order to learn and to predict the most likely next event in the sequence.

Feedback data may comprise context data 142. For example, in conjunction with speech processing data 140 indicating that the user interrupted playback of content, context data 142 may indicate that the day of the week during which the user interrupted playback was Monday, the time was 7:35 am, and that the user was located in Boston, Mass.

Additionally, feedback data may comprise user data 144. For example, an identity of the user or users interacting with speech-processing enabled devices 110a, 110b may be provided as feedback data. Feedback data may comprise device data 146 including an indication that the user selected content via an interface of speech-processing enabled devices 110a, 110b, and/or a device type of the device with which the user is interacting. Further examples of speech processing data 140, context data 142, user data 144, and device data 146 are described above in reference to FIG. 1.

Feedback data 206a, 206b, . . . , 206n may each be associated with respective timestamps 208a, 208b, . . . , 208n. Timestamp data may indicate a time at which the particular feedback data occurred. For example, feedback data 206a may be associated with timestamp 208a indicating a time at which feedback data 206a occurred. Content recommender 122 may store feedback data 206a, 206b, . . . , 206n in memory 103. Timestamps 208a, 208b, . . . 208n may each be stored in memory 103 in association with the respective feedback data to which the timestamp pertains.

Content recommender 122 may be effective to determine content (among content 202a, 202b, . . . , 202n) that was displayed/played back during a time at which feedback data was received by comparing timestamps of the feedback data with timestamps of the output content. For example, sports news audio of the previous evening's basketball scores may be played back as content 202a by speech-processing enabled device 110a between 07:31:05 am and 07:31:24 am (the timing indicated by timestamp 204a). Feedback data 206a (e.g., the user interrupting the playback to request that weather information be provided instead) may be received at 07:31:24 am (the timing indicated by timestamp 208a). Content recommender 122 may determine that the feedback data 206a corresponds to the content 202a based on the timing of the feedback (e.g., timestamp 208a) in relation to the timing of the playback of the content 202a (indicated by timestamp 204a). In various examples, a decay model may be used to determine a strength of an association between a user action (e.g., user feedback data such as interaction with content) and content that was recently displayed. For example, a decay model may be used to form a correlations between a user action and output content based on the duration between the output of the content and the user interaction with the content. Accordingly, content recommender 122 may store the feedback data 206a (and/or a data representation thereof) in memory 103 in association with content 202a. In various examples, the feedback data 206a in association with content 202a, and in association with any other data relevant to content 202a (e.g., speech-processing data 140, context data 142, user data 144, device data 146, etc.) may comprise an instance of training data (e.g., labeled training data) that may comprise a portion of batch training data 220. Once the number of instances of training data stored in batch training data 220 exceeds a predefined amount (e.g., a threshold amount), the training data may be used to update parameters of predictor/ranker 134 of content recommender 122.

Predictor/ranker 134 may comprise a number of layers with each layer comprising a number of nodes storing activation values. Parameters (e.g., "weights") control activations in neurons (or nodes) within layers of the predictor/ranker 134. For example, the weighted sum of activations of each neuron in a preceding layer may be input to an activation function (e.g., a sigmoid function and/or rectified linear units (ReLu) function). The result may determine the activation of a neuron in a subsequent layer. In addition, a bias value may be used to shift the output of the activation function to the left or right on the x-axis and thus may bias a neuron toward inactivation.

Generally, in machine learning models, after initialization, annotated training data, such as batch training data 220, may be used to generate a cost or "loss" function that describes the difference between expected output of the machine learning model (e.g., the known label of the training data) and actual output in the output layer of the model. The parameters (e.g., weights and/or biases) of the machine learning model may be updated to minimize (or maximize) the cost. For example, the machine learning model may use a gradient descent algorithm to incrementally adjust the weights to cause the most rapid decrease (or increase) to the output of the loss function, depending on the desired training objective. Predictor/ranker 134 may be iteratively trained whenever a suitable amount of batch training data 220 has been accumulated in memory 103. Various machine learning algorithms may be used to determine recommended content. For example, logistic regression, random forest classification, support vector machines, deep neural networks, etc. Additionally, to predict sequence data, convolutional neural networks and/or long short term memory (LSTM) models may be employed in various examples.

Additionally, in various examples, global training data may be acquired on the basis of other user interaction with other speech-processing enabled devices. While such global training data may not be as personalized as the training data generated for an individual's interaction with their own device, characteristics may be shared between people of various demographics, geographic locations, age groups, etc., and training machine learning models based on global trends may broadly improve user experience based on normative behavior, trends, and/or interaction patterns. Additionally, in at least some examples, feedback data may be used in real time as a signal provided to predictor/ranker 134 to improve content recommendation in accordance with user preferences.

After training, predictor/ranker 134 may be effective to determine feature vector embeddings for input signals (e.g., context data 142, user data 144, device data 146, ambient state data 148, timing data 150, etc.) and may generate an output recommending one or more items of content for output (e.g., ranked list 138). In various examples, after training the model and determining feature vector embeddings for various input features, similarities and/or commonalities among feature embeddings may be determined using techniques such as cosine similarity, correlation, Euclidean distance, etc. A recommended action (e.g., content to display and/or output) may be content that is associated with the most similar features, as determined using the aforementioned techniques. Input signals (e.g., context data 142, user data 144, device data 146, ambient state data 148, timing data 150, etc.) may be collected in real time and recommendations may be updated accordingly as the input signals change over time.

In various examples, predictor/ranker 134 may be trained using a subset of the various input signals described above.

For example, predictor/ranker 134 may be trained to recommend content solely on the basis of timing data 150. In such an example, timestamps 208*a*, 208*b*, ..., 208*n* may be used as timing data associated with feedback data 206, which may represent user interaction with output content. Accordingly, the predictor/ranker 134 may be trained using the feedback data and the timing data (timestamps 208*a*, 208*b*, ..., 208*n*, in this example). Thereafter, during prediction, the feature extractor 132 and/or predictor/ranker 134 may generate an input feature based on the current time (and/or other timing data such as the day of the week, day of the month, etc.) and may determine the content most likely to be of interest based on the particular trained instance of the model.

In another example, predictor/ranker 134 may be trained to recommend content based on location data describing device location (e.g., device data 146). In such an example, feedback data 206 may be accumulated and associated with device data 146 describing a location of the device that received the feedback data 206. As previously described, feedback data 206 may represent a user interaction with content (e.g., a user request for currently displayed and/or output content). Accordingly, predictor/ranker 134 may be trained using labeled training data comprising an indication of the feedback data 206 and the location of the device that received the feedback data. Thereafter, during prediction, the feature extractor 132 and/or predictor/ranker 134 may generate an input feature based on the current location describing the location of the device (e.g., kitchen, living room, geographic location, etc.) and may determine the content most likely to be of interest based on the particular trained instance of the model.

In some examples, an output from multiple trained models (e.g., a predictor/ranker 134 trained using only timing data 150, a predictor/ranker 134 trained using only context data 142, and a predictor/ranker 134 trained using only ambient state data 148) may be used to generate content recommendations for output in an ambient mode of the device. For example, each of the three models may output a set of 10 recommendations. Thereafter, content that is common to all three sets may be selected for output. In another example implementation, content that is common to two of the three sets may be output. In another example, if no content is common between the sets the content associated with the highest confidence score from one or more sets may be selected for output. In another example, a linear combination of the three models may be used to predict content. In yet another example, the output from the three models may be sent to a separate classifier as input signals, and the separate classifier may be used to generate recommended content based on the output of the three models. Various other implementations beyond those explicitly described above are contemplated, but may not be explicitly described for purposes of clarity and brevity.

Figure 3:
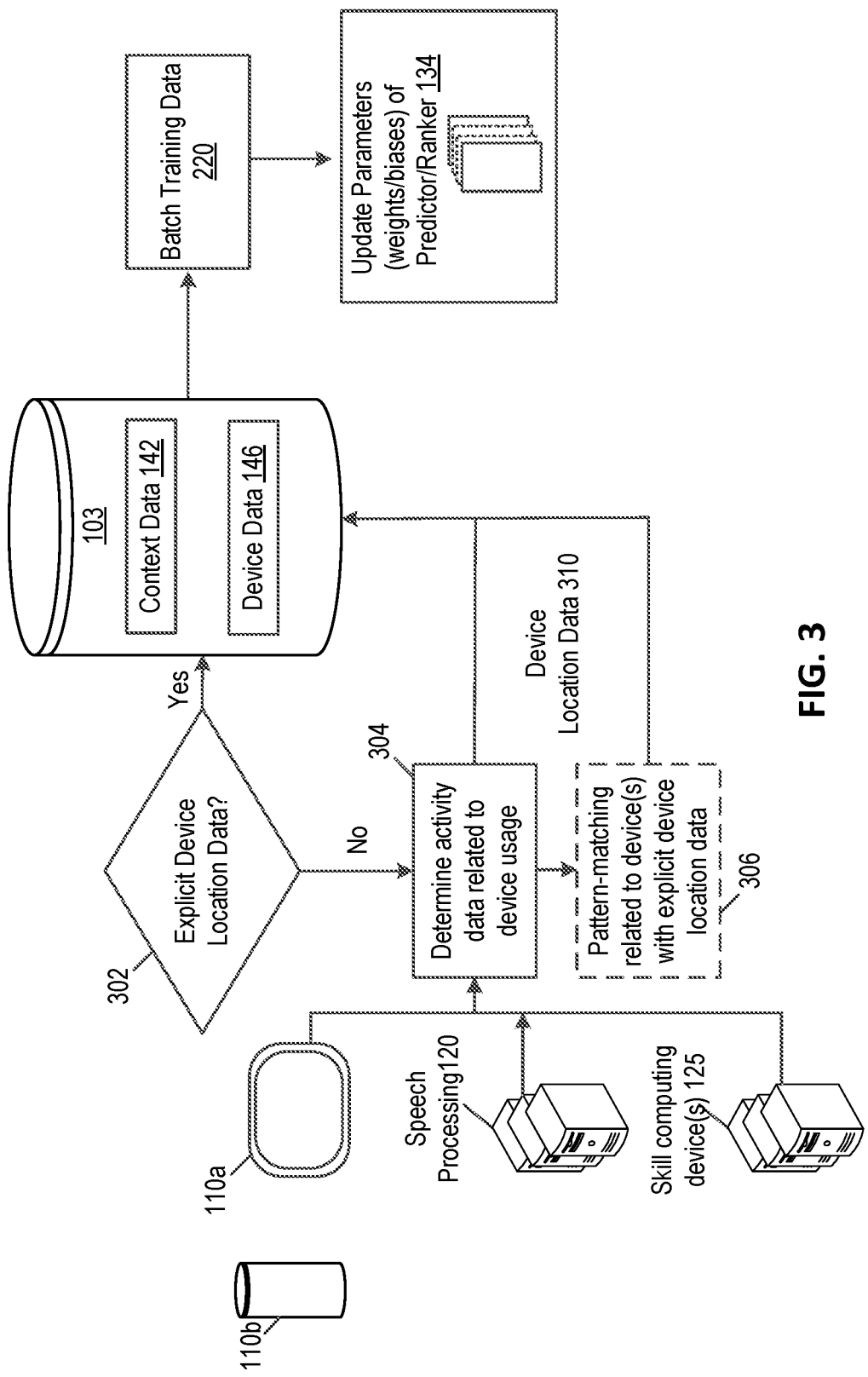
FIG. 3 illustrates an example process for determining a location of a speech-processing enabled device, in accordance with various embodiments described herein.

FIG. 3 illustrates an example process for determining a location of a speech-processing enabled device, in accordance with various embodiments described herein. Those components that have been previously described in reference to FIGS. 1-2 may not be described again herein for purposes of clarity and brevity. Various processes described in reference to FIG. 3 may be performed by content recommender 122 and/or by some combination of content recommender 122 and speech-processing computing device(s) 120.

In various examples, at action 302, a determination may be made whether explicit device location data exists for a particular speech-processing enabled device 110*a*, 110*b*. For example, a user may indicate through a companion application of speech-processing enabled device 110*a* that the device is located in the kitchen, bedroom, office, or some other location. In such examples, such explicit location data may be stored in memory 103 (e.g., as context data 142 and/or device data 146). However, in other examples where explicit location data is unavailable for speech-processing enabled devices 110*a*, 110*b*, data related to device usage may be provided at action 304. Device usage data may be provided by speech-processing enabled devices 110*a*, 110*b*, by speech-processing computing device(s) 120 (e.g., indicating skills, activities, and/or actions commonly requested by the pertinent speech-processing enabled devices 110*a*, 110*b*). In various examples, content recommender 122 may comprise a classifier effective to predict device location based on activities representing past usage of the speech-processing enabled devices. In various examples, training data for such models may comprise activity data from speech-processing enabled devices with explicit location data. Accordingly, device location may be predicted in a supervised machine learning environment. However, in at least some other examples, device location may be learned in an unsupervised manner based solely on common user interactions with the device. In at least some examples, probabilistic classifiers, clustering algorithms, and/or other machine learning models may be used to determine a set of N-best labels representing location data for a particular device.

At action 306, pattern matching may be conducted to match activities and/or patterns of activities for a device without explicit location data to activities and/or patterns of activity for a device and/or devices with known location data. As indicated by dashed lines in FIG. 3, action 306 may be optional. In a particular example, there may be no explicit device location data for speech-processing enabled device 110*a*. Activity data provided by speech-processing computing device(s) 120 and/or skill computing device(s) 125 may indicate that the most commonly invoked actions are related to food preparation (e.g., recipes and/or kitchen techniques) and/or music. In various examples, a machine learning model may be effective to generate feature representation data representing the most common activities and may predict a location for the device. In various examples, the machine learning model may also receive global training data based on patterns of activities of devices with known location data, as described above. In various examples, the device location prediction (e.g., device location data 310) for speech-processing enabled device 110*a* may be stored in memory 103 in association with a device ID or other identifying characteristic of speech-processing enabled device 110*a*. The device ID or identifying characteristic may be effective to identify the particular speech-processing enabled device from among other speech-processing enabled devices. In some examples, a device type (e.g., a large display-enabled device, a small non-display enabled device, etc.) may be used to infer location data and/or may be included with context data 142 and/or device data 146 that is used by predictor/ranker 134 to determine ranked list 138. For example, smaller devices may tend to be in bedrooms while larger devices with displays may tend to be in living rooms and/or kitchens. Device type may thus be used to determine content to display during an ambient state of the particular device. In some further examples, device location may be inferred from a name of the device provided by a customer (e.g., through a companion application for speech-processing enabled device(s) 110*a*, 110*b*). For example, a device named "Bob's kitchen Echo Show" may be input into a machine learning model (e.g., NLU) to determine that the device is likely in the kitchen based on the name data for the device. Such inferred device location data 310 may be stored as context data 142 and/or device data 146 and may be used to predict content that may be output while speech-processing enabled device(s) 110a, 110b are in an ambient state.

In various examples, a classifier may be used to predict device location data based on pattern matching. For example, a number of sample devices with known location data may be determined. Data may be collected related to usage (e.g., user interaction with content) of the sample devices over a time period. The data collected in association with devices of known location may be used to train a model to predict device location based on user interaction. In various examples, the model may employ logistic regression, random forest classifier, support vector machine, deep neural network and/or any other classification algorithm for prediction. Thereafter, at action 306, the trained model may be used to determine the location of a particular device over time. As described above in reference to FIG. 2, in some example embodiments, the location of a particular device may be used by predictor/ranker 134 to determine relevant content for output by the device when in an ambient state.

As previously described, device location data 310 may become context data 142 and/or device data 146 that may be used in batch training of predictor/ranker 134 to update parameters of predictor/ranker 134 in order to learn the best content to output by speech-processing enabled device 110a while the device is in an ambient state.

Figure 4A:
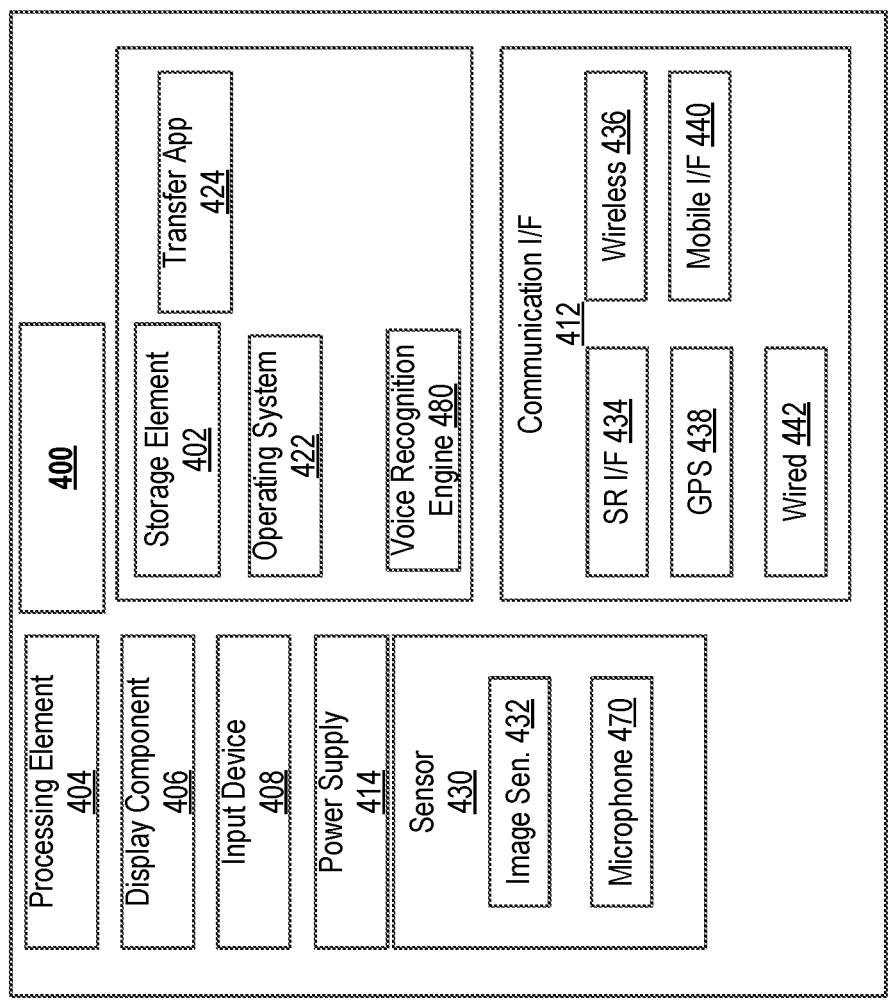
FIGS. 4A-4B are block diagrams showing example architectures of computing devices that may be used in accordance with various embodiments described herein.

FIG. 4A is a block diagram showing an example architecture 400 of a computing device (e.g., speech-processing enabled device 110a and/or 110b), in accordance with various aspects of the present disclosure. It will be appreciated that not all devices will include all of the components of the architecture 400 and some user devices may include additional components not shown in the architecture 400. The architecture 400 may include one or more processing elements 404 for executing instructions and retrieving data stored in a storage element 402. The processing element 404 may comprise at least one processor. Any suitable processor or processors may be used. For example, the processing element 404 may comprise one or more digital signal processors (DSPs). In some examples, the processing element 404 may be effective to determine device data 146. The storage element 402 can include one or more different types of memory, data storage, or computer-readable storage media devoted to different purposes within the architecture 400. For example, the storage element 402 may comprise flash memory, random-access memory, disk-based storage, etc. Different portions of the storage element 402, for example, may be used for program instructions for execution by the processing element 404, storage of images or other digital works, and/or a removable storage for transferring data to other devices, etc.

The storage element 402 may also store software for execution by the processing element 404. An operating system 422 may provide the user with an interface for operating the computing device and may facilitate communications and commands between applications executing on the architecture 400 and various hardware thereof. A transfer application 424 may be configured to receive images, audio, and/or video from another device (e.g., a mobile device, image capture device, and/or display device) or from an image sensor 432 and/or microphone 470 included in the architecture 400. In some examples, the transfer application 424 may also be configured to send the received voice requests to one or more voice recognition servers (e.g., speech-processing computing device(s) 120).

When implemented in some user devices, the architecture 400 may also comprise a display component 406. The display component 406 may comprise one or more light-emitting diodes (LEDs) or other suitable display lamps. Also, in some examples, the display component 406 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 406 may be effective to display content determined by content recommender 122 while in an ambient state (e.g., when in an idle state or not otherwise performing an action in response to a user request).

The architecture 400 may also include one or more input devices 408 operable to receive inputs from a user. The input devices 408 can include, for example, a push button, touch pad, touch screen, wheel, joystick, keyboard, mouse, trackball, keypad, light gun, game controller, or any other such device or element whereby a user can provide inputs to the architecture 400. These input devices 408 may be incorporated into the architecture 400 or operably coupled to the architecture 400 via wired or wireless interface. In some examples, architecture 400 may include a microphone 470 or an array of microphones for capturing sounds, such as voice requests. Voice recognition engine 480 may interpret audio signals of sound captured by microphone 470. In some examples, voice recognition engine 480 may listen for a "wake-word" to be received by microphone 470. Upon receipt of the wake-word, voice recognition engine 480 may stream audio to a voice recognition server for analysis, such as speech-processing computing device(s) 120. In various examples, voice recognition engine 480 may stream audio to external computing devices via communication interface 412.

When the display component 406 includes a touch-sensitive display, the input devices 408 can include a touch sensor that operates in conjunction with the display component 406 to permit users to interact with the image displayed by the display component 406 using touch inputs (e.g., with a finger or stylus). The architecture 400 may also include a power supply 414, such as a wired alternating current (AC) converter, a rechargeable battery operable to be recharged through conventional plug-in approaches, or through other approaches such as capacitive or inductive charging.

The communication interface 412 may comprise one or more wired or wireless components operable to communicate with one or more other computing devices. For example, the communication interface 412 may comprise a wireless communication module 436 configured to communicate on a network, such as the network 104, according to any suitable wireless protocol, such as IEEE 802.11 or another suitable wireless local area network (WLAN) protocol. A short range interface 434 may be configured to communicate using one or more short range wireless protocols such as, for example, near field communications (NFC), Bluetooth, Bluetooth LE, etc. A mobile interface 440 may be configured to communicate utilizing a cellular or other mobile protocol. A Global Positioning System (GPS) interface 438 may be in communication with one or more earth-orbiting satellites or other suitable position-determining systems to identify a position of the architecture 400. A wired communication module 442 may be configured to communicate according to the USB protocol or any other suitable protocol.

The architecture 400 may also include one or more sensors 430 such as, for example, one or more position sensors, image sensors, and/or motion sensors. An image sensor 432 is shown in FIG. 4. Some examples of the architecture 400 may include multiple image sensors 432. For example, a panoramic camera system may comprise multiple image sensors 432 resulting in multiple images and/or video frames that may be stitched and may be blended to form a seamless panoramic output. An example of an image sensor 432 may be a camera configured to capture color information, image geometry information, and/or ambient light information.

Figure 4B:
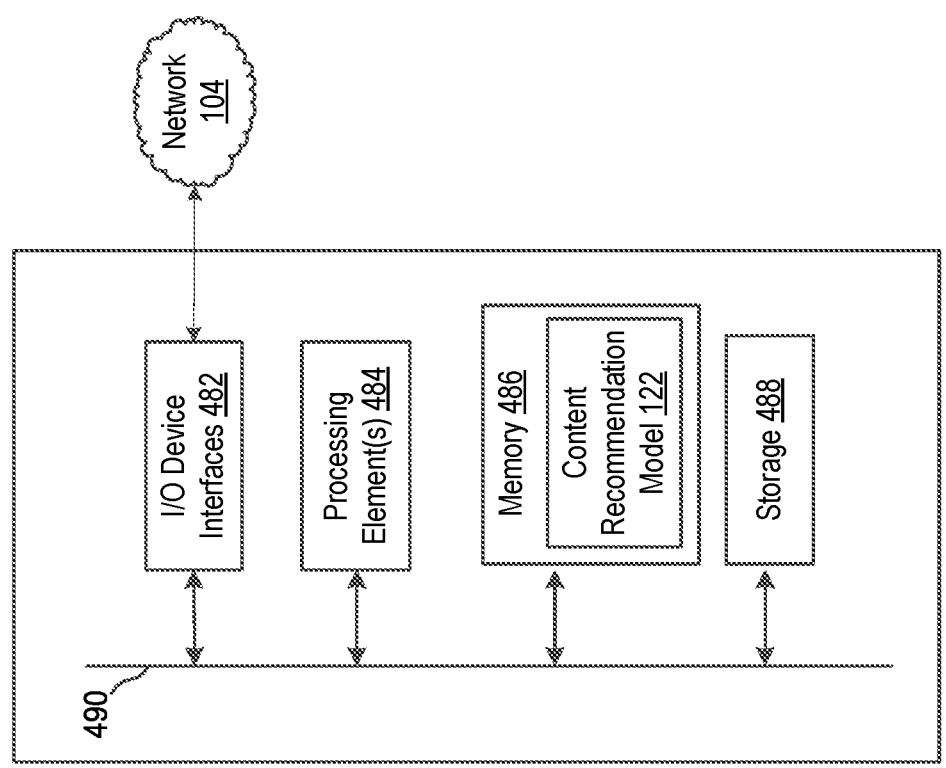

FIG. 4B is a block diagram conceptually illustrating example components of a remote device, such as the computing device(s) 102 and/or speech-processing computing device(s) 120, which may assist with ASR processing, NLU processing, applicable protocol recognition, and/or command processing. Multiple computing devices 102 and/or speech-processing computing device(s) 120 may be included in the system, such as one speech-processing computing device 120 for performing ASR processing, one speech-processing computing device 120 for performing NLU processing, one or more computing devices 102 implementing content recommender 122, etc. In operation, each of these devices (or groups of devices) may include computer-readable and computer-executable instructions that reside on the respective device, as will be discussed further below.

Each of these devices (102/120) may include one or more controllers/processors 484, which may each include at least one central processing unit (CPU) for processing data and computer-readable instructions, and a memory 486 for storing data and instructions of the respective device. In at least some examples, memory 486 may store, for example, a list of N-best intents data that may be generated for a particular utterance. In some examples, memory 486 may store speech processing data 140, context data 142, user data 144, and/or device data 146. In various further examples, memory 486 may be effective to store instructions effective to program controllers/processors 484 to perform the various techniques described above in reference to content recommender 122 in FIGS. 1-3. Accordingly, in FIG. 4B, content recommender 122 is depicted as being stored within memory 486. The memories 486 may individually include volatile random access memory (RAM), non-volatile read only memory (ROM), non-volatile magnetoresistive memory (MRAM), and/or other types of memory. Each device (102/120) may also include a data storage component 488 for storing data and controller/processor-executable instructions. Each data storage component 488 may individually include one or more non-volatile storage types such as magnetic storage, optical storage, solid-state storage, etc. Each device (102/120) may also be connected to removable or external non-volatile memory and/or storage (such as a removable memory card, memory key drive, networked storage, etc.) through respective input/output device interfaces 482. In various examples, batch training data 220, feedback data 206a, 206b, . . . , 206n, timestamps 204a, . . . , 204n, timestamps 208a, . . . 208n, may be stored in memory 486 and/or storage 488.

Computer instructions for operating each device (102/120) and its various components may be executed by the respective device's processing element(s) 484, using the memory 486 as temporary "working" storage at runtime. A device's computer instructions may be stored in a non-transitory manner in non-volatile memory 486 (e.g., a non-transitory computer-readable memory), storage 488, or an external device(s). Alternatively, some or all of the executable instructions may be embedded in hardware or firmware on the respective device in addition to or instead of software.

Each device (102/120) includes input/output device interfaces 482. A variety of components may be connected through the input/output device interfaces 482, as will be discussed further below. Additionally, each device (102/120) may include an address/data bus 490 for conveying data among components of the respective device. Each component within a device (102/120) may also be directly connected to other components in addition to (or instead of) being connected to other components across the bus 490.

As noted above, multiple devices may be employed in a single system. In such a multi-device system, each of the devices may include different components for performing different aspects of the system's processing. The multiple devices may include overlapping components. The components of the computing device(s) 102 and the speech-processing computing device(s) 120, as described herein, are exemplary, and may be located as a stand-alone device or may be included, in whole or in part, as a component of a larger device or system.

Figure 5:
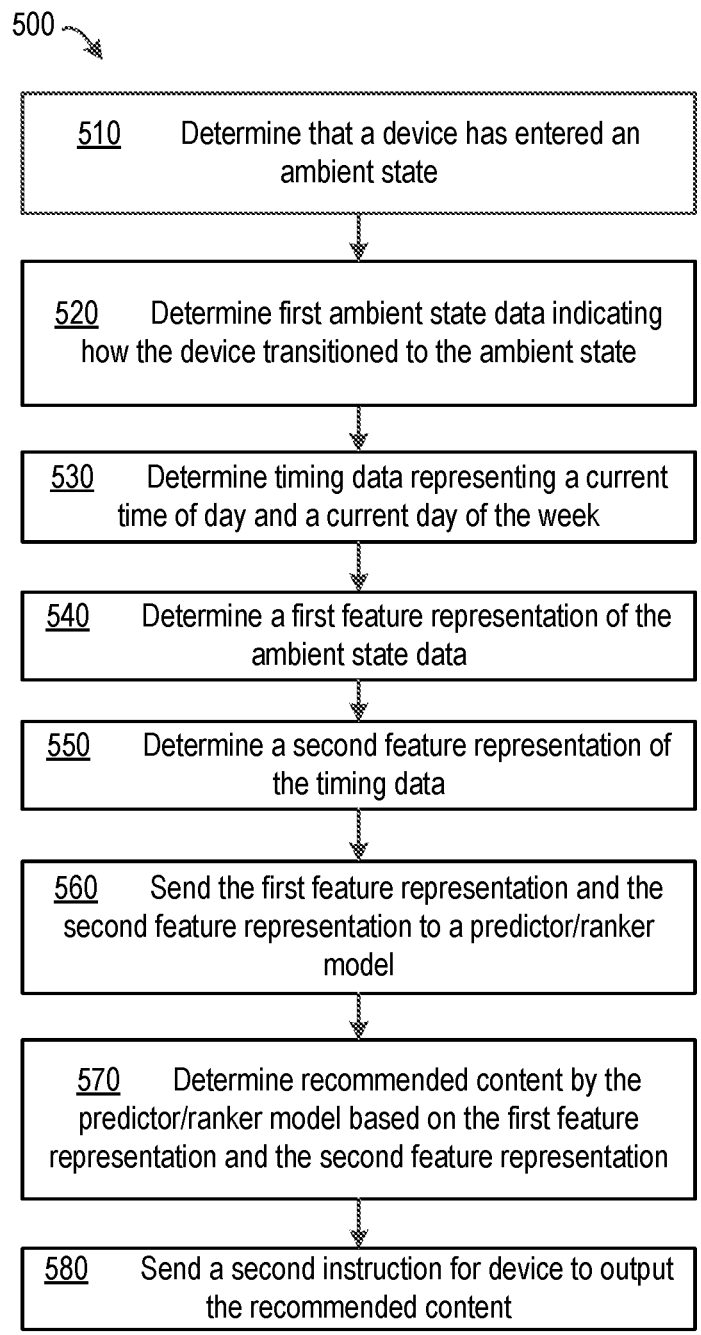
FIG. 5 depicts a flow chart showing an example process for providing recommended content to a speech-processing enabled device, in accordance with various aspects of the present disclosure.

FIG. 5 depicts a flow chart showing an example process 500 for providing recommended content to a speech-processing enabled device (e.g., speech-processing enabled devices 110a, 110b), in accordance with various aspects of the present disclosure. Those portions of FIG. 5 that have been previously discussed in reference to FIGS. 1-4B may not be described again for purposes of clarity and brevity. The actions of the process 500 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

In some examples, process 500 may begin at action 510, "Determine that a device has entered an ambient state". At action 510, a device such as speech-processing enabled device(s) 110a, 110b, or another device, may enter an ambient state. For example, the device may have not processed any requests for a threshold amount of time triggering a timeout and an entry into an ambient state. In another example, a user may request that the device enter into a home state (e.g., by saying "Go home" or by selecting a home icon). In another example, the device may enter an ambient state according to a predefined routine (e.g., after the conclusion of a movie, song, etc.). The device may store state indicator data that may indicate a current state of the device. Accordingly, when the device is in an ambient state, the state indicator data may represent the current ambient state. Content recommender 122 may determine using the state indicator data that the device is in an ambient state.

Process 500 may continue from action 510 to action 520, "Determine first ambient state data indicating how the device transitioned into the ambient state." At action 520, the device may send ambient state data to content recommender 122. The ambient state data may indicate how the device transitioned into the ambient state. For example, the ambient state data may indicate that an action executing on the device timed out without further input and that the device entered into the ambient state following the timeout. In another example, the ambient state data may indicate that the device transitioned into the ambient state based on a request for the device to return to a home screen.

Processing may continue from action 520 to action 530, "Determine timing data representing a current time of day and a current day of the week." At action 530, timing data may be determined and may be sent to content recommender 122. Timing data may comprise timing 150 data described above in reference to FIG. 1. The timing data may indicate a current time of day at a location where the device is located and a current day of the week. The timing data may additionally indicate a day of the calendar year.

Processing may continue from action 530 to action 540, "Determine a first feature representation of the ambient state data." At action 540, feature extractor 132 may determine first feature data (e.g., an embedding) representing the ambient state data. In various examples, the first feature data may be computed according to a function that takes ambient state data as an input and outputs the feature data. For example, the ambient state data may be represented as an n-dimensional vector representing a way in which the device entered into the ambient state.

Processing may continue from action 540 to action 550, "Determine a second feature representation of the timing data." At action 550, feature extractor 132 may determine second feature data (e.g., an embedding) representing the timing data. In various examples, the second feature data may be computed according to a function. For example, the timing data may be represented as an n-dimensional vector representing a time of the day, a day of the week, a day of the month, a day of the year, etc.

Processing may continue from action 550 to action 560, "Send the first feature representation and the second feature representation to a predictor/ranker model." At action 560, the first feature representation and the second feature representation may be sent to one or more machine learning models. For example, the first feature representation and the second feature representation may be concatenated and used to control the activation of neurons in an input layer of predictor/ranker 134. In the current example, predictor/ranker 134 may be trained to recommend content based at least in part on timing data and ambient state data.

Processing may continue from action 560 to action 570, "Determine recommended content by the predictor/ranker model based on the first feature representation and the second feature representation." At action 570, activations of neurons in an output layer of the predictor/ranker 134 may be used to determine recommended content. As previously described, the predictor/ranker may be trained based on prior interactions with content by labeling prior interactions (e.g., feedback data 206) with the relevant timing data and/or ambient state data. The training data may be used to update weights/biases of the predictor/ranker using back propagation. Processing may continue from action 570 to action 580, "Send a second instruction for device to output the recommended content." At action 580, the content recommender 122 may send an instruction for the device to output the recommended content determined by the predictor/ranker of content recommender 122.

Figure 6:
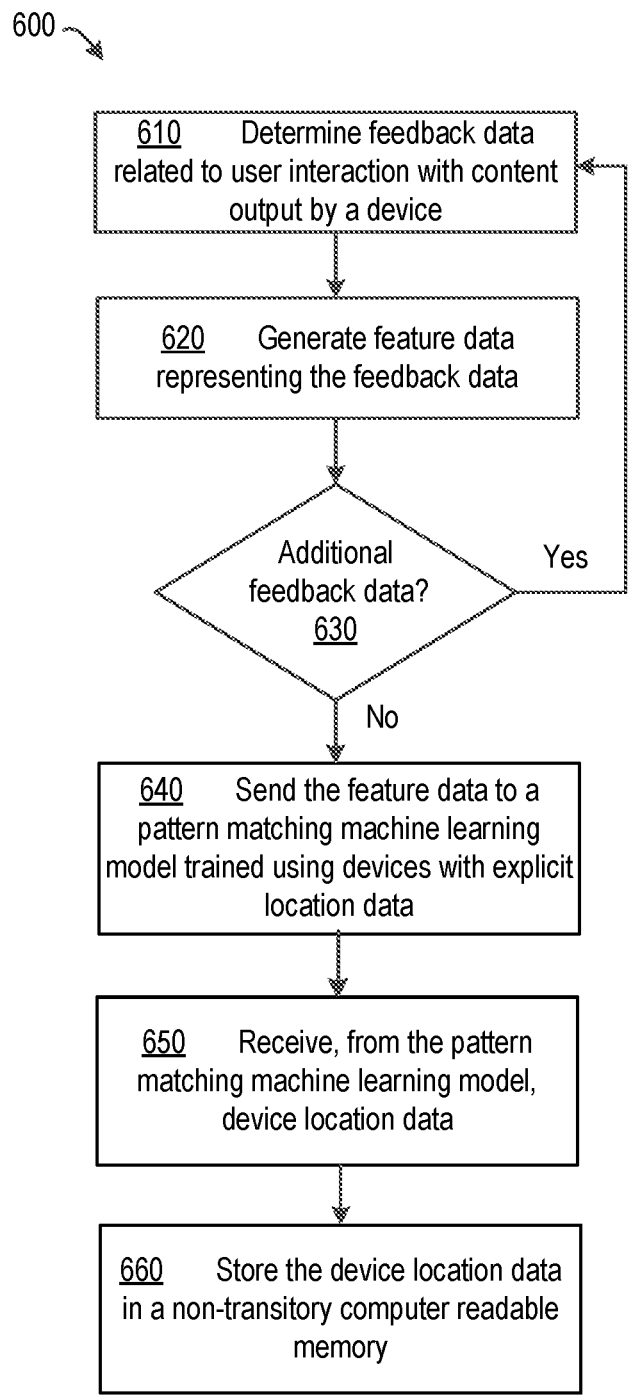
FIG. 6 depicts a flow chart showing another example process for inferring device location data, in accordance with various aspects of the present disclosure.

FIG. 6 depicts a flow chart showing an example process 600 for inferring device location data (e.g., a room location of speech-processing enabled devices 110a, 110b), in accordance with various aspects of the present disclosure. Those portions of FIG. 6 that have been previously discussed in reference to FIGS. 1-5 may not be described again for purposes of clarity and brevity. The actions of the process 600 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

In some examples, process 600 may begin at action 610, "Determine feedback data related to user interaction with content output by a device". At action 610, feedback data may be determined. For example, data representing a user request for content displayed by a device may be feedback data. In another example, speech processing data indicating that a user stated "Don't show me that again," when a content item was being displayed may be feedback data. In another example, a user requesting content even if the content is not currently being output may be feedback data.

In some examples, process 600 may proceed from action 610 to action 620, "Generate feature data representing the plurality of activities". At action 620, feature data (e.g., feature vectors and/or feature maps) may be generated representing the feedback data determined at action 610. In various examples, the feature data may be computed according to a function and the feature data may represent an embedding of the feedback data that may be used as an input to the pattern matching machine learning model discussed herein.

At action 630 a determination may be made whether additional feedback data is available and/or is needed to determine device location using the pattern matching machine learning model. If additional feedback data is available and/or required, processing may return to action 610. However, if sufficient feedback data has been obtained and/or if no additional feedback data is available for the device, processing may proceed to action 640, "Send the feature data to a pattern matching machine learning model trained using devices with explicit location data." In various examples, the pattern-matching machine learning model may be implemented by computing device(s) 102 or by one or more other computing devices accessible via network 104. The pattern-matching machine learning model may be trained using feedback data from devices with known location data (e.g., "kitchen", "bedroom", "office", etc.). In various examples, the pattern-matching machine learning model may be trained using supervised or unsupervised training data to generate a location prediction based on a set of usage activities represented as input feature data (e.g., the feature data generated at action 620). Accordingly, the pattern-matching machine learning model may generate device location data (e.g., a prediction of the location of speech-processing enabled device 110a, 110b based on the usage data). As previously described, pattern-matching machine learning model may employ logistic regression, random forest classification, support vector machines, and/or deep neural networks to predict device location.

Process 600 may proceed from action 640 to action 650, "Receive, from the pattern matching machine learning model, device location data". At action 650, the device location data predicted by the pattern-matching machine learning model may be sent to computing device(s) 102 and/or content recommender 122. In various further examples, the device location data may be sent to the device (e.g., speech-processing enabled device 110a, 110b) for which the location data has been predicted.

Process 600 may proceed from action 650 to action 660, "Store the device location data in a non-transitory computer readable memory". At action 660, the device location data may be stored in memory (e.g., a local memory of speech-processing enabled device 110a, 110b or a memory of content recommender 122). In various examples, the location data may be stored in a data structure in association with a device identifier of the device for which the location data has been determined.

Figure 7:
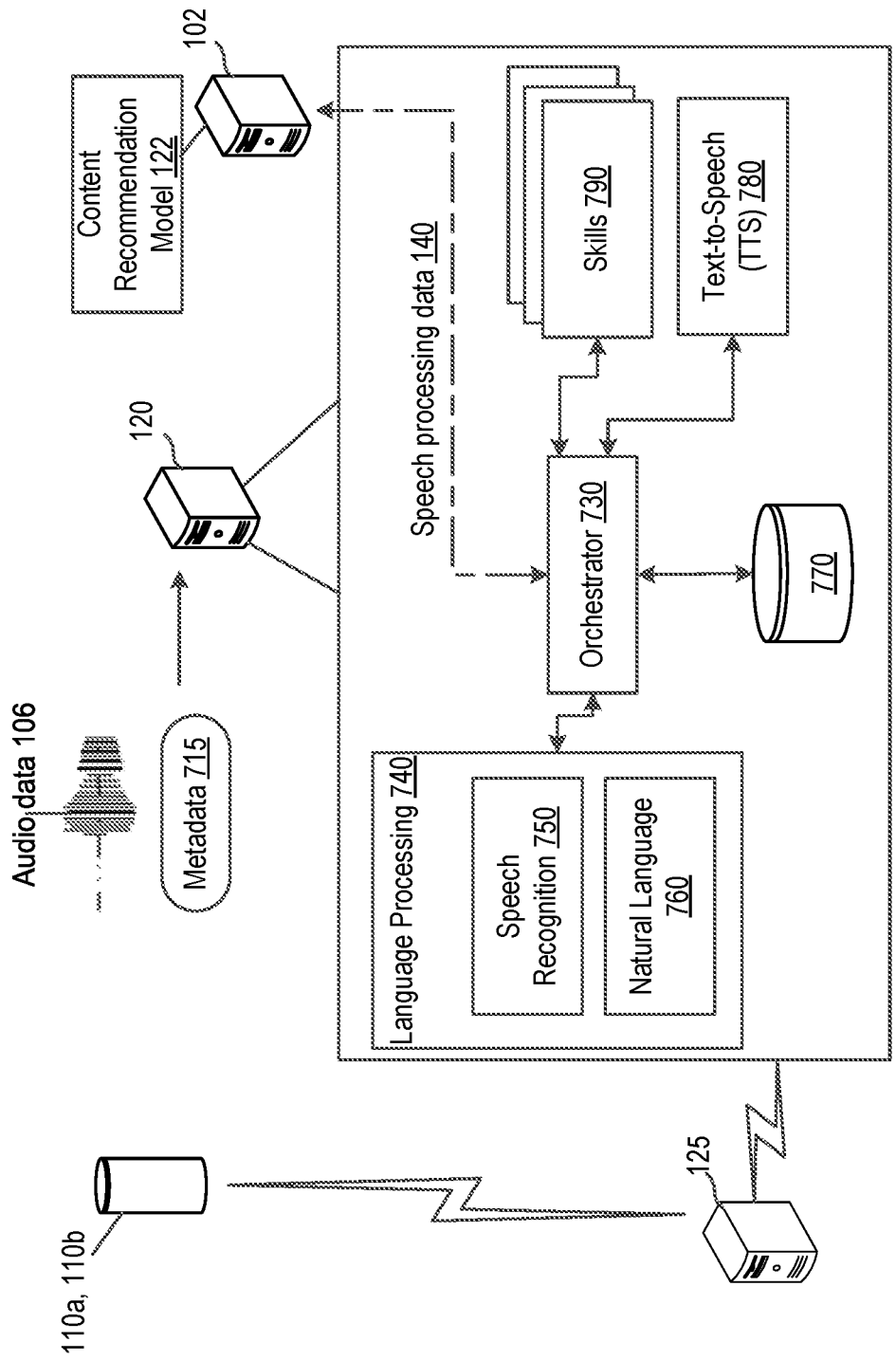
FIG. 7 is a conceptual diagram of components of a speech-processing device(s) according to various embodiments of the present disclosure.

A system according to the present disclosure may operate using various components as described in FIG. 7. The various components illustrated FIG. 7 may be located on a same or different physical devices. Communication between various components illustrated in FIG. 7 may occur directly or across a network 104. The speech-processing enabled device(s) 110a, 110b may capture audio using an audio capture component, such as the microphone(s) 470 (FIG. 4A). The speech-processing enabled device(s) 110a, 110b may send audio data 106 (e.g., representing a spoken user request), corresponding to spoken audio, to the speech-processing computing device(s) 120. The speech-processing enabled device(s) 110a, 110b may include a wakeword detection component that detects when input audio includes a spoken wakeword. In some instances, the speech-processing enabled device(s) 110a, 110b may be configured to send audio data 106 to the speech-processing computing device(s) 120 when the speech-processing enabled device(s) 110a, 110b detects a spoken wakeword. The speech-processing enabled device(s) 110a, 110b may also send metadata 715 (e.g., including encoded states of speech-processing enabled device(s) 110a, 110b, timestamp data, etc.) to the speech-processing computing device(s) 120. The metadata 715 may be created by a computing component of the speech-processing enabled device(s) 110a, 110b.

Upon receipt by the speech-processing computing device(s) 120, the audio data 106 may be sent to an orchestrator 730. The orchestrator 730 may include memory and logic that enables the orchestrator 730 to transmit various pieces and forms of data to various components of the system. In various examples, orchestrator 730 may be configured in communication with computing device(s) 102 and content recommender 122 executing on computing device(s) 102. For example, orchestrator 730 may send speech processing data 140, context data 142, and/or user data 144 to computing device(s) 102.

The orchestrator 730 may send the audio data 106 to a language processing component 740. An ASR component 750 (e.g., a speech recognition component) of the language processing component 740 transcribes the audio data 106 into one or more hypotheses representing speech contained in the audio data 106. The ASR component 750 interprets the speech in the audio data based on a similarity between the characteristics of the audio data corresponding to the speech and pre-established language models. For example, the ASR component 750 may compare the audio data 106 with models for sounds (e.g., subword units such as phonemes) and sequences of sounds to identify words that match the sequence of sounds in the speech represented in the audio data 106. The ASR component 750 may send text data generated thereby to a Natural language component 760 of the language processing component 740. The text data output by the ASR component 750 may include a top scoring hypothesis of the speech represented in the audio data 106 or may include an N-best list including a group of hypotheses of the speech represented in the audio data 106, and potentially respective scores ASR processing confidence scores.

The Natural language component 760 attempts to make a semantic interpretation of the phrases or statements represented in the text data input therein. That is, the Natural language component 760 determines one or more meanings associated with the phrases or statements represented in the text data based on individual words represented in the text data. The Natural language component 760 interprets a text string to derive an intent of the user (e.g., an action that the user desires be performed) as well as pertinent pieces of information in the text data that allow a device (e.g., the speech-processing computing device(s) 120, the skill computing device(s) 125, etc.) to complete the intent. For example, if the text data corresponds to "Play the new album by [Musical Artist]", the Natural language component 760 may determine the user intended to invoke a music playback intent with to play the relevant album. In various examples, the metadata 715 may be an indication of data displayed and/or output by speech-processing enabled device(s) 110a, 110b. Accordingly, the metadata 715 may be provided to content recommender 122 executing on computing device(s) 102 along with NLU data representing a semantic interpretation of the user speech as feedback data (e.g., feedback data 206a, 206b, . . . , 206n) that may be used by content recommender 122 to predict content of interest to a particular user and/or for a particular speech-processing enabled device(s) 110a, 110b. In various examples, orchestrator 730 may send speech processing data 140 (e.g., feedback data representing a semantic interpretation of user speech) to content recommender 122. In at least some examples, speech processing data 140 may comprise a data representation of user sentiment (e.g., user speech representing a positive or negative reaction associated with content output by speech-processing enabled device(s) 110a, 110b while in an ambient state). In some other examples, a machine learning model executed by speech-processing computing device(s) 120 and/or computing device(s) 102 may score semantic interpretations of user speech in order to rank speech as indicating positive/negative user sentiment with respect to the content output by speech-processing enabled device(s) 110a, 110b. For example, a convolutional neural network may be trained to score spoken user feedback that selects the currently-output content or praises the currently-output content highly, while scoring user feedback that interrupts the currently-output content or disparages the currently-output content lowly. It should be appreciated that the foregoing example is merely one implementation and other models may be used to estimate user sentiment. The scores may be provided to content recommender 122 and may be used to train and select content for output, as described herein. In various examples, skills 790 (e.g., executed by speech-processing computing device(s) 120 and/or by skill computing device(s) 125) may send speech processing data 140 to content recommender 122 in response to generating an action corresponding to a spoken user request.

The speech-processing computing device(s) 120 may include a profile storage 770. The profile storage 770 may include a variety of information related to individual users, groups of users, etc. that interact with the system. For example, the profile storage 770 may store user data 144, device data 146, and/or context data 142. The user profile storage 770 may include one or more profiles. Each profile may be associated with a different identifier (ID), such as an identifier of speech-processing enabled device(s) 110a, 110b. A profile may be an umbrella profile specific to a group of users. That is, a profile encompasses two or more individual user profiles, each associated with a respective unique user ID. For example, a profile may be a household profile that encompasses user profiles associated with multiple users of a single household. Similarly, a profile may be associated with two or more users of a household and other speech-processing enabled devices of those users). A profile may include preferences shared by all the user profiles encompassed thereby. Each user profile encompassed under a single profile may include preferences specific to the user associated therewith. That is, each user profile may include preferences unique from one or more other user profiles encompassed by the same profile. A user profile may be a stand-alone profile or may be encompassed under a customer profile. As illustrated, the user profile storage 770 is implemented as part of the speech-processing computing device(s) 120. However, it should be appreciated that the user profile storage 770 may be located proximate to the speech-processing computing device(s) 120, or may otherwise be in communication with the speech-processing computing device(s) 120, for example over the network(s) 104.

The speech-processing computing device(s) 120 may include one or more skills 790 configured to perform the various techniques herein disclosed, as well as other, processes. The speech-processing computing device(s) 120 may also be in communication with one or more skill computing device(s) 125 that execute one or more skills configured to perform the herein disclosed, as well as other, processes. To enable a skill 790 to execute, orchestrator 730 may send output from the Natural language component 760 (e.g., text data including tags attributing meaning to the words and phrases represented in the text data), and optionally output from the user recognition component 295 and/or data from the profile storage 770, to the skill 790.

The speech-processing computing device(s) 120 may also include a TTS component 780 that synthesizes speech (e.g., generates audio data) corresponding to text data input therein. The TTS component 780 may perform speech synthesis using one or more different methods. In one method of synthesis called unit selection, the TTS component 780 matches text data against one or more databases of recorded speech. Matching units are selected and concatenated together to form audio data. In another method of synthesis called parametric synthesis, the TTS component 780 varies parameters such as frequency, volume, and noise to create an artificial speech waveform output. Parametric synthesis uses a computerized voice generator, sometimes called a vocoder.

The various components (730/740/750/760/780/790) described above may exist in software, hardware, firmware, or some combination thereof.

The computing device(s) 102 and/or the speech-processing computing device(s) 120 may reside on speech-processing enabled device(s) 110a, 110b in a cloud computing environment, or some combination thereof. For example, the speech-processing enabled device(s) 110a, 110b may include computing equipment, some portion of which is configured with all/some of the components/functionality of speech-processing computing device(s) 120 and another portion of which is configured with all/some of the components/functionality of computing device(s) 102. The speech-processing enabled device(s) 110a, 110b may then perform a variety of functions on its own (such as when remote communications are unavailable), and/or may communicate (when capable) with remote based computing device(s) 102 and/or the speech-processing computing device(s) 120 to perform other functions. Alternatively, all of the functionality may reside on the speech-processing enabled device(s) 110a, 110b or remotely.

Figure 8:
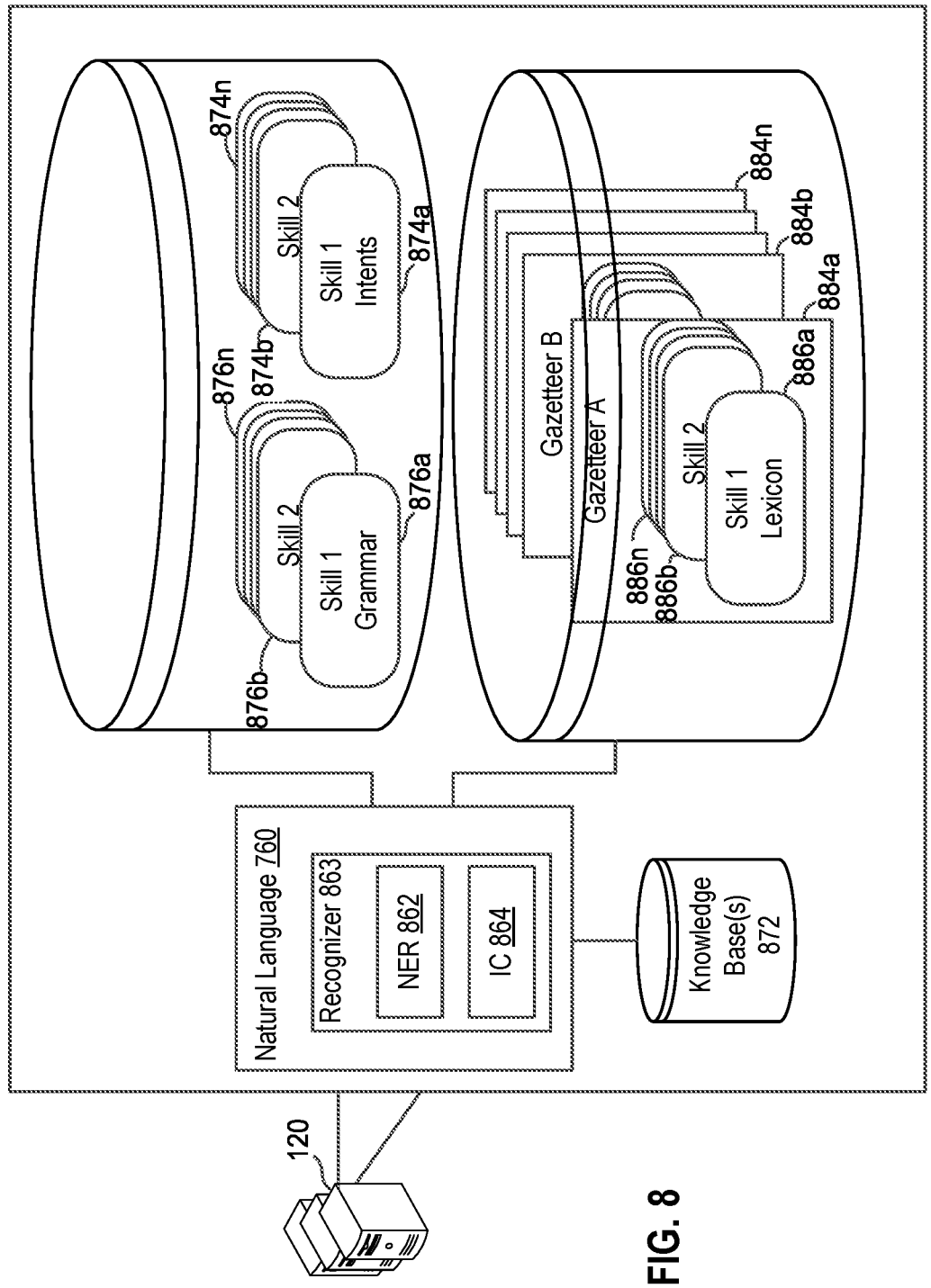
FIG. 8 is a conceptual diagram illustrating how natural language understanding processing is performed according to embodiments of the present disclosure.

FIG. 8 illustrates how NLU processing is performed on text data. Generally, the Natural language component 760 attempts to make a semantic interpretation of text data input thereto. That is, the natural language component 760 determines the meaning behind text data based on the individual words and/or phrases represented therein. The natural language component 760 interprets text data to derive an intent of the user as well as pieces of the text data that allow a device (e.g., the speech-processing enabled device(s) 110a, 110b, the speech-processing computing device(s) 120, etc.) to complete that action.

The natural language component 760 may process text data including several ASR hypotheses. The natural language component 760 may process all (or a portion of) the ASR hypotheses input therein. Even though the ASR component 750 may output multiple ASR hypotheses, the natural language component 760 may be configured to only process with respect to the top scoring ASR hypothesis.

The natural language component 760 may include one or more recognizers 863. Each recognizer 863 may be associated with a different skill 790. Each recognizer 863 may process with respect to text data input to the natural language component 760. Each recognizer 863 may operate at least partially in parallel with other recognizers 863 of the natural language component 760.

Each recognizer 863 may include a named entity recognition (NER) component 862. The NER component 862 attempts to identify grammars and lexical information that may be used to construe meaning with respect to text data input therein. The NER component 862 identifies portions of text data that correspond to a named entity that may be applicable to processing performed by a skill 790. The NER component 862 (or other component of the natural language component 760) may also determine whether a word refers to an entity whose identity is not explicitly mentioned in the text data, for example "him," "her," "it" or other anaphora, exophora or the like.

Each recognizer 863, and more specifically each NER component 862, may be associated with a particular grammar model and/or database, a particular set of intents/actions (e.g., in intents database 874), and a particular personalized lexicon 886. Each gazetteer 884 may include skill-indexed lexical information associated with a particular user. For example, a Gazetteer A (884a) includes skill-indexed lexicon 886a to 886n. A user's music skill lexical information might include album titles, artist names, and song names, for example, whereas a user's contact list skill lexical information might include the names of contacts. Since every user's music collection and contact list is presumably different, this personalized information improves entity resolution.

An NER component 862 applies grammar models 876 and lexicon 886 to determine a mention of one or more entities in text data. In this manner, the NER component 862 identifies "slots" (corresponding to one or more particular words in text data) that may be used for later processing. The NER component 862 may also label each slot with a type (e.g., noun, place, city, artist name, song name, etc.).

Each grammar model 876 includes the names of entities (i.e., nouns) commonly found in speech about the particular skill 790 to which the grammar model 876 relates, whereas the lexicon 886 is personalized to the user and/or the speech-processing enabled device 110 from which the user input originated. For example, a grammar model 876 associated with a shopping skill may include a database of words commonly used when people discuss shopping.

Each recognizer 863 may also include an intent classification (IC) component 864. An IC component 864 parses text data to determine an intent(s). An intent represents an action a user desires be performed. An IC component 864 may communicate with an intents database 874 of words linked to intents. For example, a music intent database may link words and phrases such as "quiet," "volume off," and "mute" to a <Mute> intent. An IC component 864 identifies potential intents by comparing words and phrases in text data to the words and phrases in an intents database 874.

The intents identifiable by a specific IC component 864 are linked to skill-specific grammar models 876 with "slots" to be filled. Each slot of a grammar model 876 corresponds to a portion of text data that the system believes corresponds to an entity. For example, a grammar model 876 corresponding to a <PlayMusic> intent may correspond to sentence structures such as "Play {Artist Name}," "Play {Album Name}," "Play {Song name}," "Play {Song name} by {Artist Name}," etc. However, to make resolution more flexible, grammar models 876 may not be structured as sentences, but rather based on associating slots with grammatical tags.

For example, an NER component 862 may parse text data to identify words as subject, object, verb, preposition, etc. based on grammar rules and/or models prior to recognizing named entities in the text data. An IC component 864 (e.g., implemented by the same recognizer 863 as the NER component 862) may use the identified verb to identify an intent. The NER component 862 may then determine a grammar model 876 associated with the identified intent. For example, a grammar model 876 for an intent corresponding to <PlayMusic> may specify a list of slots applicable to play the identified "object" and any object modifier (e.g., a prepositional phrase), such as {Artist Name}, {Album Name}, {Song name}, etc. The NER component 862 may then search corresponding fields in a lexicon 886, attempting to match words and phrases in text data the NER component 862 previously tagged as a grammatical object or object modifier with those identified in the lexicon 886.

An NER component 862 may perform semantic tagging, which is the labeling of a word or combination of words according to their type/semantic meaning. An NER component 862 may parse text data using heuristic grammar rules, or a model may be constructed using techniques such as hidden Markov models, maximum entropy models, log linear models, conditional random fields (CRF), and the like. For example, an NER component 862 implemented by a music recognizer may parse and tag text data corresponding to "play mother's little helper by the rolling stones" as {Verb}: "Play," {Object}: "mother's little helper," {Object Preposition}: "by," and {Object Modifier}: "the rolling stones." The NER component 862 identifies "Play" as a verb, which an IC component 864 may determine corresponds to a <PlayMusic> intent. At this stage, no determination has been made as to the meaning of "mother's little helper" and "the rolling stones," but based on grammar rules and models, the NER component 862 has determined the text of these phrases relates to the grammatical object (i.e., entity) of the user input represented in the text data.

The models linked to the intent are then used to determine what database fields should be searched to determine the meaning of these phrases, such as searching a user's gazetteer 884 for similarity with the model slots. For example, a model for a <PlayMusic> intent might indicate to attempt to resolve the identified object based on {Artist Name}, {Album Name}, and {Song name}, and another model for the same intent might indicate to attempt to resolve the object modifier based on {Artist Name}, and resolve the object based on {Album Name} and {Song Name} linked to the identified {Artist Name}. If the search of the gazetteer 384 does not resolve a slot/field using gazetteer information, the NER component 362 may search a database of generic words (e.g., in the knowledge base 872). For example, if the text data includes "play songs by the rolling stones," after failing to determine an album name or song name called "songs" by "the rolling stones," the NER component 862 may search the database for the word "songs." In the alternative, generic words may be checked before the gazetteer information, or both may be tried, potentially producing two different results.

An NER component 862 may tag text data to attribute meaning thereto. For example, an NER component 862 may tag "play mother's little helper by the rolling stones" as: {skill} Music, {intent}<PlayMusic>, {artist name} rolling stones, {media type} SONG, and {song title} mother's little helper. For further example, the NER component 862 may tag "play songs by the rolling stones" as: {skill} Music, {intent}<PlayMusic>, {artist name} rolling stones, and {media type} SONG.

Figure 9:
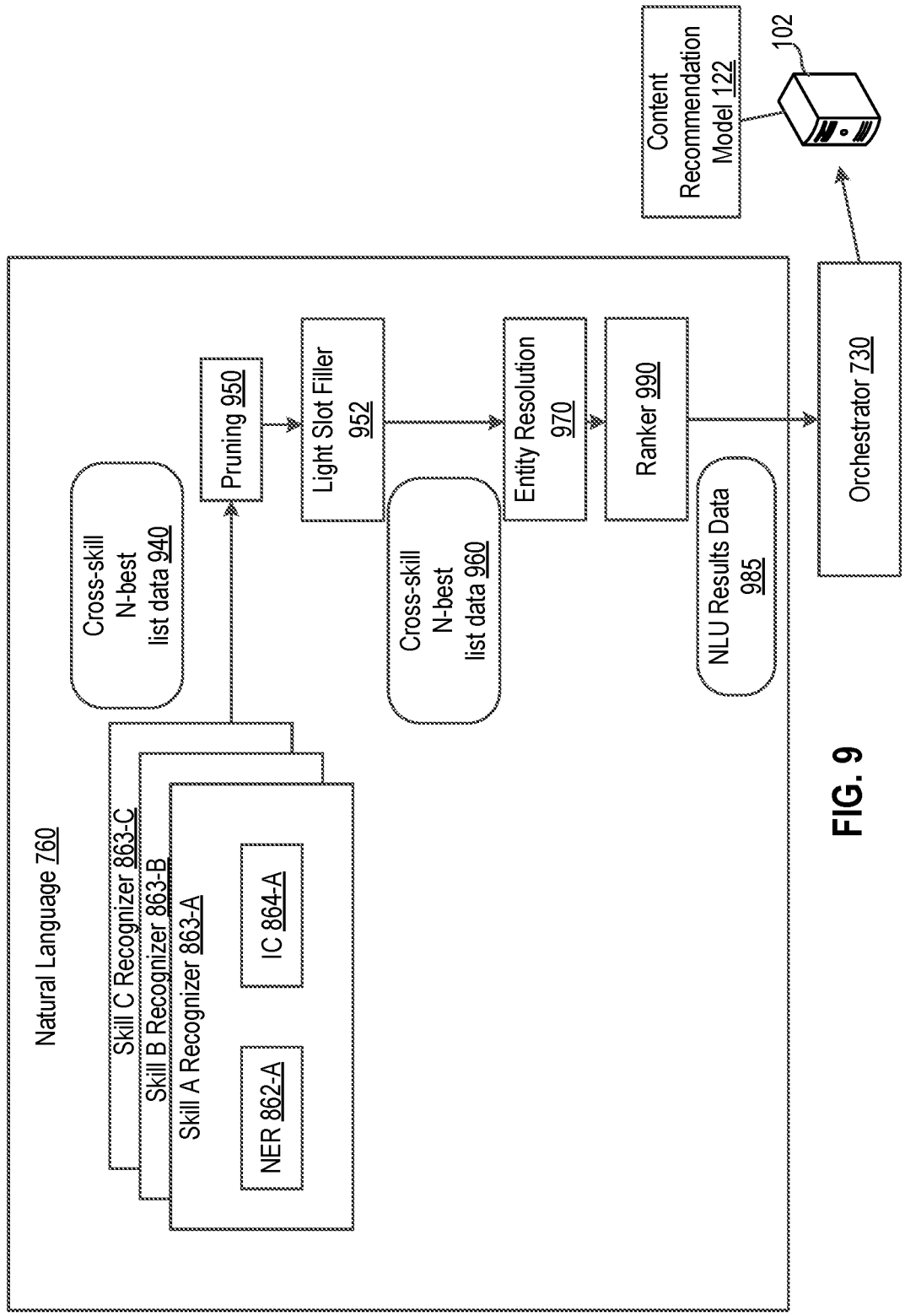
FIG. 9 is a conceptual diagram illustrating additional detail regarding natural language understanding processing according to embodiments of the present disclosure.

The natural language component 760 may generate cross-skill N-best list data 940, which may include a list of NLU hypotheses output by each recognizer 863 (as illustrated in FIG. 9). A recognizer 863 may output tagged text data generated by an NER component 862 and an IC component 864 operated by the recognizer 863, as described above. Each NLU hypothesis including an intent indicator and text/slots may be grouped as an NLU hypothesis represented in the cross-skill N-best list data 940. Each NLU hypothesis may also be associated with one or more respective score(s) for the NLU hypothesis. For example, the cross-skill N-best list data 940 may be represented as, with each line representing a separate NLU hypothesis:

[0.95] Intent: <PlayMusic> ArtistName: Lady Gaga SongName: Poker Face

[0.95] Intent: <PlayVideo> ArtistName: Lady Gaga VideoName: Poker Face

[0.01] Intent: <PlayMusic> ArtistName: Lady Gaga AlbumName: Poker Face

[0.01] Intent: <PlayMusic> SongName: Pokerface

In at least some examples, speech processing data 140 may comprise NLU data generated by natural language component 760. For example, NLU data may indicate that a user interrupted an action related to content displayed on speech-processing enabled device 110a while in an ambient state. In another example, NLU data may indicate that a user invoked a skill related to content displayed on speech-processing enabled device 110a while in an ambient state. Feature data representative of the speech processing data 140 may be extracted by feature extractor 132 (FIG. 1) and provided as an input to predictor/ranker 134 predictor/ranker 134 may be effective to output ranked lists of content to be output by speech-processing enabled device(s) 110a, 110b while in an ambient state.

In various examples, the cross-skill N-best list data 940 and/or 960 may comprise the N-best Intents data—e.g., a list of N intents with the highest confidence scores among intents scored for a particular utterance). The natural language component 760 may send the cross-skill N-best list data 940 to a pruning component 950. The pruning component 950 may sort the NLU hypotheses represented in the cross-skill N-best list data 940 according to their respective scores. The pruning component 950 may then perform score thresholding with respect to the cross-skill N-best list data 940. For example, the pruning component 950 may select NLU hypotheses represented in the cross-skill N-best list data 940 associated with confidence scores satisfying (e.g., meeting and/or exceeding) a threshold confidence score. The pruning component 950 may also or alternatively perform number of NLU hypothesis thresholding. For example, the pruning component 950 may select a maximum threshold number of top scoring NLU hypotheses. The pruning component 950 may generate cross-skill N-best list data 960 including the selected NLU hypotheses. The purpose of the pruning component 950 is to create a reduced list of NLU hypotheses so that downstream, more resource intensive, processes may only operate on the NLU hypotheses that most likely represent the user's intent. In various examples, orchestrator 730 and/or another component of speech processing computing device(s) 120 may send speech processing data 140 (e.g., NLU hypotheses, user intents, user satisfaction scores, etc.) to content recommender 122 of computing device(s) 102. Content recommender 122 may extract feature data from the speech processing data 140 that may be used to predict content (and/or other parameters related to the content, such as duration, frequency, timing-of-output, etc.). Additionally, speech processing data 140 may be feedback data (e.g., feedback data 206) that may be used to train and/or retrain predictor/ranker 134 of content recommender 122.

The natural language component 760 may also include a light slot filler component 952. The light slot filler component 952 can take text data from slots represented in the NLU hypotheses output by the pruning component 950 and alter it to make the text data more easily processed by downstream components. The light slot filler component 952 may perform low latency operations that do not involve heavy operations, such as those requiring reference to a knowledge base. The purpose of the light slot filler component 952 is to replace words with other words or values that may be more easily understood by downstream system components. For example, if an NLU hypothesis includes the word "tomorrow," the light slot filler component 952 may replace the word "tomorrow" with an actual date for purposes of downstream processing. Similarly, the light slot filler component 952 may replace the word "CD" with "album" or the words "compact disc." The replaced words are then included in the cross-skill N-best list data 960.

The natural language component 760 sends the cross-skill N-best list data 960 to an entity resolution component 970. The entity resolution component 970 can apply rules or other instructions to standardize labels or tokens from previous stages into an intent/slot representation. The precise transformation may depend on the skill 790. For example, for a travel skill, the entity resolution component 970 may transform text data corresponding to "Seattle airport" to the standard SEA three-letter code referring to the airport. The entity resolution component 970 can refer to a knowledge base that is used to specifically identify the precise entity referred to in each slot of each NLU hypothesis represented in the cross-skill N-best list data 960. Specific intent/slot combinations may also be tied to a particular source, which may then be used to resolve the text data. In the example "play songs by the stones," the entity resolution component 970 may reference a personal music catalog, Amazon Music account, user profile data, or the like. The entity resolution component 970 may output text data including an altered N-best list that is based on the cross-skill N-best list data 960, and that includes more detailed information (e.g., entity IDs) about the specific entities mentioned in the slots and/or more detailed slot data that can eventually be used by downstream components to perform an action responsive to the user input. The natural language component 760 may include multiple entity resolution components 970 and each entity resolution component 970 may be specific to one or more skills 790.

The entity resolution component 970 may not be successful in resolving every entity and filling every slot represented in the cross-skill N-best list data 960. This may result in the entity resolution component 970 outputting incomplete results.

The natural language component 760 may include a ranker component 990. The ranker component 990 may assign a particular confidence score to each NLU hypothesis input therein. The confidence score of an NLU hypothesis may represent a confidence of the system in the NLU processing performed with respect to the NLU hypothesis. The confidence score of a particular NLU hypothesis may be affected by whether the NLU hypothesis has unfilled slots. For example, if an NLU hypothesis associated with a first skill includes slots that are all filled/resolved, that NLU hypothesis may be assigned a higher confidence score than another NLU hypothesis including at least some slots that are unfilled/unresolved by the entity resolution component 970.

The ranker component 990 may apply re-scoring, biasing, and/or other techniques to determine the top scoring NLU hypotheses. To do so, the ranker component 990 may consider not only the data output by the entity resolution component 970, but may also consider other data such as skill 790 rating or popularity data. For example, if one skill 790 has a particularly high rating, the ranker component 990 may increase the score of an NLU hypothesis associated with that skill 790, and vice versa. The other data may include information about skills 790 that have been enabled for the user identifier and/or device identifier associated with the current user input. For example, the ranker component 990 may assign higher scores to NLU hypotheses associated with enabled skills 790 than NLU hypotheses associated with non-enabled skills 790. The other data may include data indicating user usage history, such as if the user identifier associated with the current user input is regularly associated with user inputs that invoke a particular skill 790 or does so at particular times of day. The other data may include data indicating date, time, location, weather, type of speech-processing enabled device 110, user identifier, device identifier, context, as well as other information. For example, the ranker component 990 may consider when any particular skill 790 is currently active (e.g., music being played, a game being played, etc.) with respect to the user or speech-processing enabled device 110 associated with the current user input. The other data may include device type information. For example, if the speech-processing enabled device 110 does not include a display, the ranker component 990 may decrease the score associated with an NLU hypothesis that would result in displayable content being presented to a user, and vice versa.

Following ranking by the ranker component 990, the natural language component 760 may output NLU results data 985 to the orchestrator 730. The NLU results data 985 may include a ranked list of the top scoring NLU hypotheses as determined by the ranker component 990. Alternatively, the NLU results data 985 may include the top scoring NLU hypothesis as determined by the ranker component 990.

The orchestrator 730 may select a skill 790, based on the NLU results data 885, for performing an action responsive to the user input. In an example, the orchestrator 730 may send all (or a portion of) the NLU results data 985 to a skill 790 that is represented in the NLU results data 985 and to be invoked to perform an action responsive to the user input.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A method comprising:
   receiving, from a device, first data indicating that the device is in an ambient state;
   determining timing data indicating at least one of a time of day or a day of week;
   determining usage data indicating past usage of the device;
   determining first content for display by the device in the ambient state based at least in part on the timing data and the usage data; and
   sending a command for the device to output the first content while in the ambient state.

2. The method of claim 1, further comprising:
   determining location data indicating a location of the device;
   determining feature data representing the location data; and
   determining the first content further based at least in part on the location data.

3. The method of claim 1, further comprising:
   determining ambient state data indicating how the device entered into the ambient state;
   determining feature data representing the ambient state data; and
   determining the first content further based at least in part on the ambient state data.

4. The method of claim 1, further comprising:
   generating first feature data representing the first data;
   sending the first feature data to a first machine learning model trained using a second device, the second device being associated with known location data;
   generating, by the first machine learning model, device location data;
   storing the device location data in a non-transitory computer readable memory;
   determining second feature data representing the device location data;
   sending the second feature data to a second machine learning model; and
   determining the first content further based at least in part on the second feature data.

5. A method comprising:
   sending a first command for a device to output first content during a first time period, wherein the first command causes the device to output the first content while in an ambient state of the device;
   receiving first feedback data indicating that a first action associated with the first content was requested;
   determining that the first action was requested during the first time period;
   determining first data representing usage of the device;
   determining second content based at least in part on the first action being requested during the first time period and the first data; and sending a second command for the device to output second content during a second time period, wherein the second command causes the device to output the second content while in the ambient state.

6. The method of claim 5, further comprising:
determining first location data indicating a location of the device;
determining feature data representing the first location data; and
determining the second content further based at least in part on the first location data.

7. The method of claim 6, further comprising:
determining ambient state data indicating how the device entered into the ambient state;
determining feature data representing the ambient state data; and
determining the second content further based at least in part on the ambient state data.

8. The method of claim 5, further comprising:
receiving, from a speech-processing system, second feedback data indicating that output of the second content was interrupted by a spoken command;
generating feature data representing the second feedback data;
sending the feature data to a machine learning model;
receiving, from the machine learning model, a ranked list of content; and
sending a third instruction to the device to output content indicated in the ranked list of content during a third time period following the first time period and the second time period.

9. The method of claim 5, further comprising:
generating first feature data representing the first data;
sending the first feature data to a first machine learning model trained using a second device, the second device being associated with known location data;
generating, by the first machine learning model, device location data;
storing the device location data in a non-transitory computer readable memory;
determining second feature data representing the device location data;
sending the second feature data to a second machine learning model; and
determining the second content further based at least in part on the second feature data.

10. The method of claim 5, further comprising:
receiving context data related to the device;
generating feature data representing the context data;
sending the feature data to a machine learning model;
receiving, from the machine learning model, a list of content;
determining that the list of content comprises the second content; and
selecting, from the list of content, the second content based at least in part on the list of content comprising the second content.

11. The method of claim 5, further comprising:
determining a list of content to output by the device, the list of content comprising the first content and the second content;
sending the list of content to a machine learning model;
sending the first data to the machine learning model;
determining by the machine learning model an order in which to output the first content and the second content; and
sending data indicating the order to the device.

12. The method of claim 11, further comprising:
determining a first normalized discounted cumulative gain (NDCG) value for the first content;
determining a second NDCG value for the second content, wherein the first NDCG value is lower than the second NDCG value based at least in part on the order indicating that the first content is output prior to the second content;
generating second feedback data representing an interaction with the first content;
modifying the second feedback data using the first NDCG value; and
determining by the machine learning model a second order in which to output the first content and the second content.

13. The method of claim 5, further comprising:
determining first timing data related to a current time of the device; and
determining the second content further based at least in part on the first timing data.

14. A computing device comprising:
at least one processor; and
at least one non-transitory computer readable memory storing instructions that, when executed by the at least one processor, program the at least one processor to perform a method comprising:
send a first command for a device to output first content during a first time period, wherein the first command causes the device to output the first content while in an ambient state of the device;
receive first feedback data indicating that a first action associated with the first content was requested;
determine that the first action was requested during the first time period;
determine first data representing usage of the device;
determine second content based at least in part on the first action being requested during the first time period and the first data; and
send a second command for the device to output second content during a second time period, wherein the second command causes the device to output the second content while in the ambient state.

15. The computing device of claim 14, wherein the instructions, when executed by the at least one processor, are effective to program the at least one processor to perform the method further comprising:
determine first location data indicating a location of the device;
determine feature data representing the first location data; and
determine the second content further based at least in part on the first location data.

16. The computing device of claim 14, wherein the instructions, when executed by the at least one processor, are effective to program the at least one processor to perform the method further comprising:
determine ambient state data indicating how the device entered into the ambient state;
determine feature data representing the ambient state data; and
determine the second content further based at least in part on the ambient state data.

17. The computing device of claim 14, wherein the instructions, when executed by the at least one processor, are effective to program the at least one processor to perform the method further comprising:

receive, from a speech-processing system, second feedback data indicating that output of the second content was interrupted by a spoken command;
generate feature data representing the second feedback data;
send the feature data to a machine learning model;
receive, from the machine learning model, a ranked list of content; and
send a third instruction to the device to output content indicated in the ranked list of content during a third time period following the first time period and the second time period.

18. The computing device of claim 14, wherein the instructions, when executed by the at least one processor, are effective to program the at least one processor to perform the method further comprising:
generate first feature data representing the first data;
send the first feature data to a first machine learning model trained using a second device comprising known location data;
generate, by the first machine learning model, device location data;
store the device location data in the at least one non-transitory computer readable memory;
determine second feature data representing the device location data;
send the second feature data to a second machine learning model; and
determining the second content further based at least in part on the second feature data.

19. The computing device of claim 14, wherein the instructions, when executed by the at least one processor, are effective to program the at least one processor to perform the method further comprising:
receive context data related to the device;
generate feature data representing the context data;
send the feature data to a machine learning model;
receive, from the machine learning model, a list of content;
determine that the list of content comprises the second content; and
select, from the list of content, the second content based at least in part on the list of content comprising the second content.

20. The computing device of claim 14, wherein the instructions, when executed by the at least one processor, are effective to program the at least one processor to perform the method further comprising:
determine a list of content to output by the device, the list of content comprising the first content and the second content;
send the list of content to a machine learning model;
send the first data to the machine learning model;
determine by the machine learning model an order in which to output the first content and the second content; and
send data indicating the order to the device.

* * * * *